United States Patent [19]
Kirschner et al.

[11] Patent Number: 5,494,193
[45] Date of Patent: Feb. 27, 1996

[54] POSTMIX BEVERAGE DISPENSING SYSTEM

[75] Inventors: Jonathan Kirschner, Powder Springs; Simon J. Richter, Marietta; Mark S. Heflin, Atlanta; Shawn B. Gatipon, Smyrna, all of Ga.; Jack F. Brumley, Houston, Tex.; Michael T. Romanyszyn, Jr., San Antonio, Tex.; Alfred A. Schroeder, San Antonio; Samuel Durham, San Antonio, Tex.; Harold R. Heath, Houston, Tex.; Richard O. Norman, San Antonio, Tex.; Norman P. Wittig, Corry, Pa.

[73] Assignee: The Coca-Cola Company, Atlanta, Ga.

[21] Appl. No.: 178,721

[22] Filed: Jan. 10, 1994

Related U.S. Application Data

[63] Continuation-in-part of Ser. No. 715,433, Jun. 14, 1991, abandoned, is a continuation of Ser. No. 843,757, Feb. 28, 1992, Pat. No. 5,305,923, which is a continuation of Ser. No. 752,406, Aug. 30, 1991, abandoned, which is a continuation-in-part of Ser. No. 634,857, Dec. 27, 1990, abandoned, which is a continuation-in-part of Ser. No. 534,601, Jun. 6, 1990, abandoned.

[51] Int. Cl.⁶ ................................................. B67D 5/56
[52] U.S. Cl. ............................ 222/129.1; 222/145.6; 222/256; 222/327; 222/383.2; 222/262; 418/48
[58] Field of Search ............................ 222/1, 95, 105, 222/129.1, 135, 137, 145, 252, 256, 258, 326, 327, 383, 386, 387, 389, 390, 325, 23, 52, 63, 262, 145.6, 383.2; 418/48

[56] References Cited

U.S. PATENT DOCUMENTS

| | | |
|---|---|---|
| Re. 27,876 | 1/1974 | Hudson et al. . |
| 563,978 | 7/1896 | Meinshausur . |
| 800,573 | 9/1908 | Hazelton . |
| 1,269,438 | 6/1918 | Hieztzman . |
| 1,484,331 | 2/1924 | Hopkins . |
| 1,658,217 | 2/1928 | Winkley . |
| 1,679,493 | 8/1928 | Pierce . |
| 1,681,929 | 8/1928 | Diarmond et al. . |
| 1,740,386 | 12/1929 | Baynes . |
| 1,757,736 | 5/1930 | Pritchard ............... 222/256 X |
| 1,828,317 | 10/1931 | Clapp ..................... 222/256 X |
| 1,945,813 | 2/1934 | Johnson . |
| 1,956,144 | 4/1934 | Brown . |
| 1,969,254 | 8/1934 | Bizzarri . |
| 1,975,311 | 10/1934 | Creveling . |
| 2,007,707 | 7/1935 | Dodge . |
| 2,154,677 | 4/1939 | Hartman . |

(List continued on next page.)

FOREIGN PATENT DOCUMENTS

| | | |
|---|---|---|
| 0011487 | 5/1980 | European Pat. Off. . |
| 0067466 | 12/1982 | European Pat. Off. . |
| 0266201 | 5/1988 | European Pat. Off. . |
| 0322253 | 2/1989 | European Pat. Off. . |
| 3148859 | 8/1982 | Germany . |
| 736119 | 8/1955 | United Kingdom . |

*Primary Examiner*—Andres Kashnikow
*Assistant Examiner*—Kenneth Bomberg
*Attorney, Agent, or Firm*—Thomas R. Boston

[57] ABSTRACT

A postmix juice dispensing system for dispensing a finished beverage directly from a pliable beverage concentrate having an ice point at or near freezer temperatures, with little or no conditioning. The system preferably uses a one-piece, unitary, disposable package that includes both the concentrate container and a positive displacement metering pump. The disposable package is placed in the dispenser which automatically connects the pump to a pump motor. A mixing nozzle is connected to the metering pump and a water line is connected to the mixing nozzle. Upon pushing a load button, the dispenser automatically feeds compressed air on top of a piston in the concentrate container to force concentrate into the pump. The dispenser automatically reads an indicator on the package to set the pump speed in response to the type of concentrate in the package. The dispenser requires no cleanup or sanitization and allows rapid flavor change.

1 Claim, 19 Drawing Sheets

U.S. PATENT DOCUMENTS

| | | |
|---|---|---|
| 2,201,092 | 11/1940 | Qeliet . |
| 2,312,544 | 3/1943 | Gonld et al. . |
| 2,514,441 | 7/1950 | Brown . |
| 2,515,570 | 7/1950 | Rubinfield . |
| 2,532,145 | 11/1950 | Byram . |
| 2,603,162 | 7/1952 | Lloyd . |
| 2,612,845 | 10/1952 | Byram et al. . |
| 2,656,613 | 8/1953 | Tamiminga ................ 222/146.6 |
| 2,674,263 | 4/1954 | Rupp et al. . |
| 2,686,613 | 8/1954 | Taminga . |
| 2,691,347 | 10/1954 | Zimmer, Jr. . |
| 2,731,906 | 1/1956 | King . |
| 2,765,234 | 10/1956 | Schmitt et al. . |
| 2,822,152 | 2/1958 | Knudsen ................ 222/383 |
| 2,824,673 | 2/1958 | Hanlon . |
| 2,826,152 | 3/1958 | Michie . |
| 2,905,090 | 9/1959 | Jackson . |
| 2,908,424 | 10/1959 | Illsley . |
| 3,085,719 | 4/1963 | Weber, III . |
| 3,121,516 | 2/1964 | Dewees et al. . |
| 3,178,059 | 4/1965 | Packwood, Jr. . |
| 3,211,346 | 10/1965 | Mishberg . |
| 3,273,760 | 9/1966 | Frankenberg . |
| 3,315,846 | 4/1967 | Landis et al. . |
| 3,459,337 | 8/1969 | Williamson . |
| 3,528,587 | 9/1970 | Popinski . |
| 3,529,749 | 9/1970 | Lehman et al. . |
| 3,552,606 | 1/1971 | Kroft et al. . |
| 3,552,607 | 1/1971 | Edwards et al. . |
| 3,575,319 | 4/1971 | Safianoff ................ 222/135 |
| 3,669,315 | 6/1972 | Kuchens . |
| 3,741,441 | 6/1973 | Eberle . |
| 3,791,441 | 6/1973 | Eberle ................ 222/135 |
| 3,807,606 | 4/1974 | Foerst et al. . |
| 3,934,759 | 1/1976 | Giannella et al. ................ 222/129.1 |
| 4,000,833 | 1/1977 | Marks . |
| 4,076,145 | 2/1978 | Cornelius . |
| 4,096,971 | 6/1978 | Kuchens . |
| 4,172,669 | 10/1979 | Edelbach . |
| 4,194,650 | 3/1980 | Nottke et al. . |
| 4,219,134 | 8/1980 | Wiesner . |
| 4,231,492 | 11/1980 | Rios . |
| 4,264,019 | 4/1981 | Rebutz et al. . |
| 4,325,682 | 4/1982 | Willis . |
| 4,331,267 | 5/1982 | Duncan et al. . |
| 4,356,935 | 11/1982 | Kamin . |
| 4,364,718 | 12/1982 | Brun et al. . |
| 4,382,530 | 5/1983 | Calisto . |
| 4,478,357 | 10/1984 | Jenkins . |
| 4,501,383 | 2/1985 | Iannelli . |
| 4,515,294 | 5/1985 | Udall ................ 222/105 |
| 4,518,105 | 5/1985 | Kuchens et al. . |
| 4,552,287 | 11/1985 | Dziki . |
| 4,570,832 | 2/1986 | Kroger . |
| 4,570,833 | 2/1986 | Vanderjast . |
| 4,610,378 | 4/1986 | Grossi . |
| 4,615,469 | 11/1986 | Kishi et al. ................ 222/327 |
| 4,667,554 | 5/1987 | McDermot et al. ................ 222/105 |
| 4,667,854 | 5/1987 | McDermott et al. . |
| 4,684,042 | 8/1987 | Strickler et al. . |
| 4,685,595 | 8/1987 | Segatz . |
| 4,708,266 | 11/1987 | Rudick . |
| 4,711,373 | 12/1987 | Christine . |
| 4,722,372 | 2/1988 | Hoffman et al. . |
| 4,736,873 | 4/1988 | Patriquin . |
| 4,804,109 | 2/1989 | Vanderjast . |
| 4,818,197 | 4/1989 | Mueller . |
| 4,845,487 | 7/1989 | Frantz et al. . |
| 4,860,923 | 8/1989 | Kirschner et al. . |
| 4,875,604 | 10/1989 | Czech ................ 222/383 X |
| 4,934,563 | 6/1990 | Torita et al. . |
| 4,955,509 | 9/1990 | Nevill . |
| 5,031,797 | 7/1991 | Boris et al. . |
| 5,058,780 | 10/1991 | Plister et al. . |
| 5,305,923 | 4/1994 | Kirschner et al. ................ 222/256 X |
| 5,312,017 | 5/1994 | Schroeder et al. ................ 222/327 X |

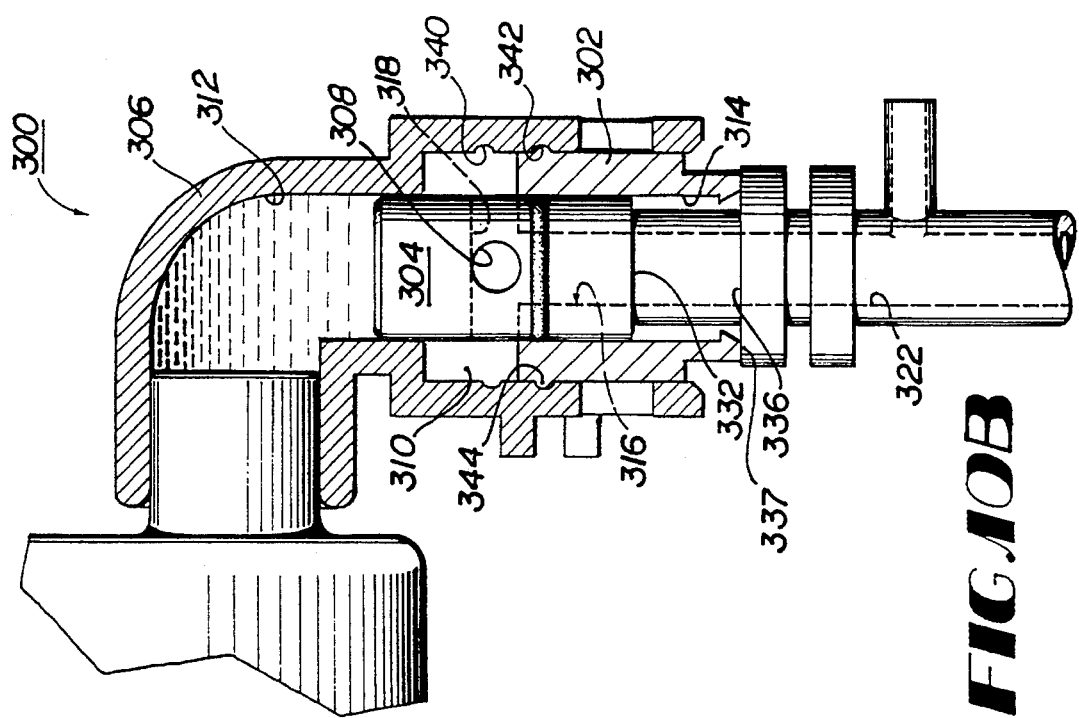
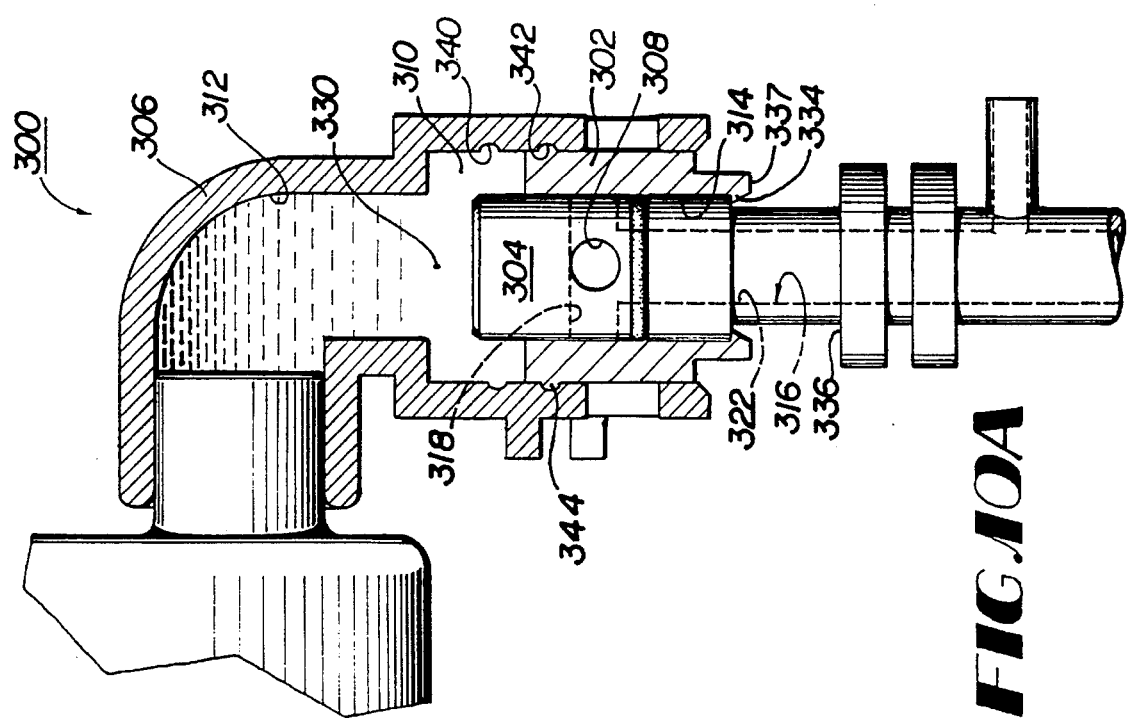

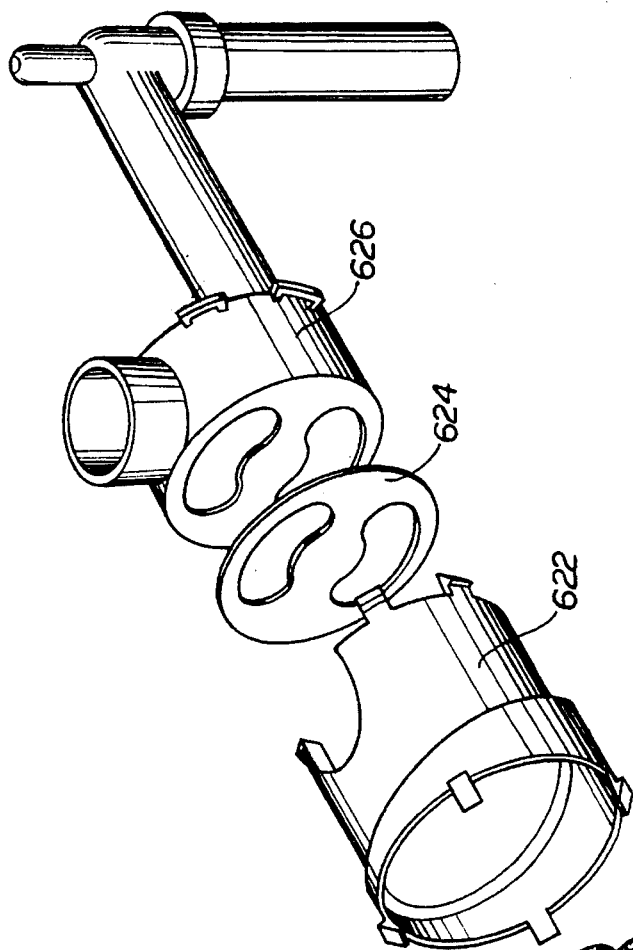
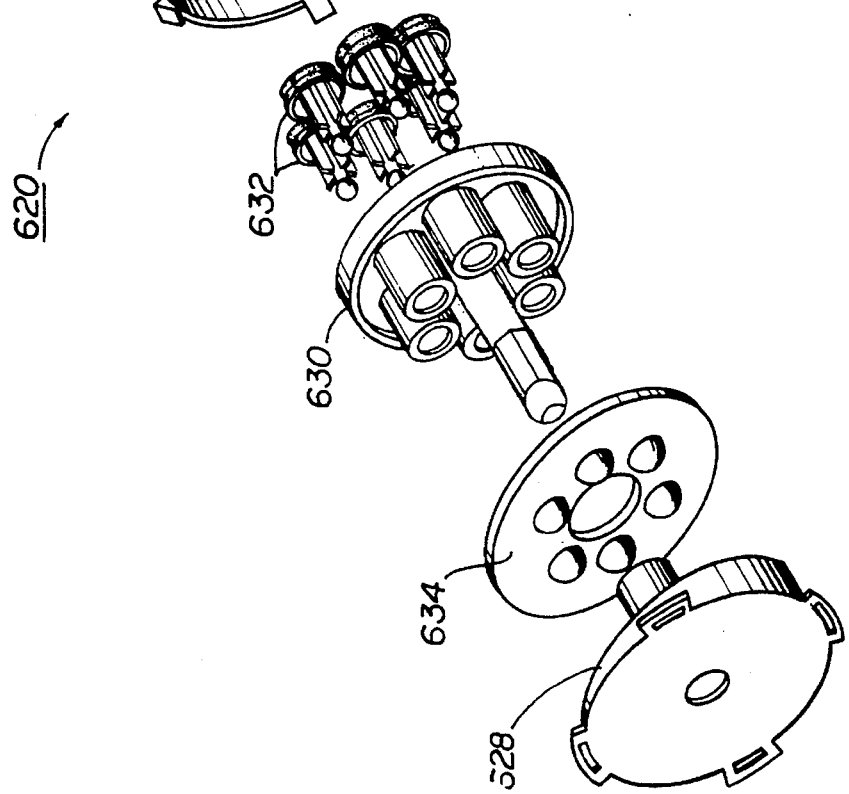
FIG.19

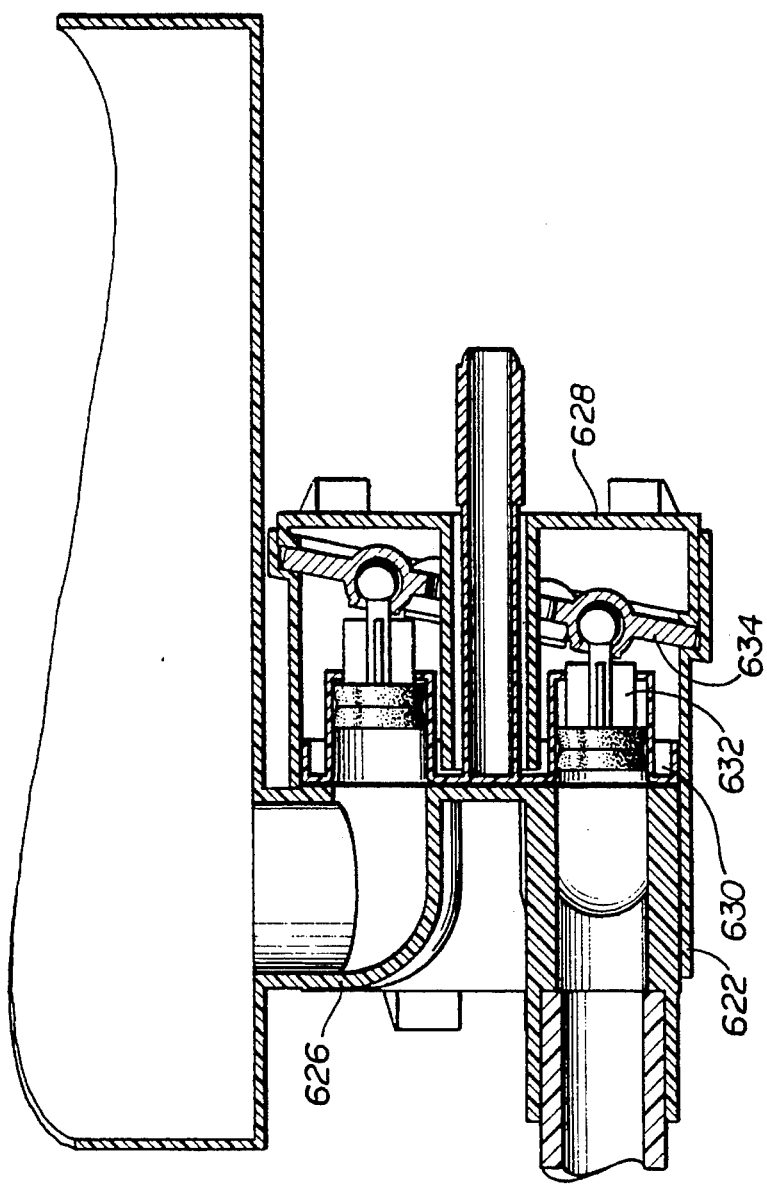
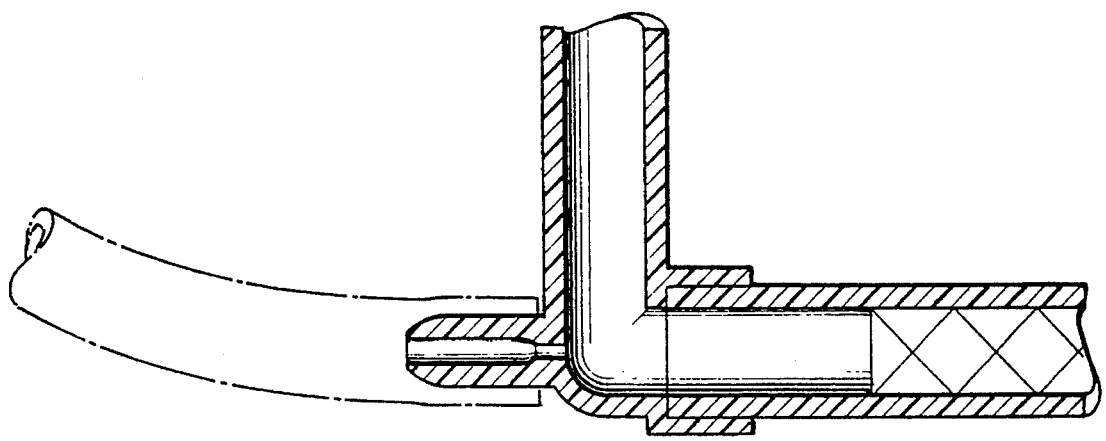
FIG 20

POSTMIX BEVERAGE DISPENSING SYSTEM

CROSS REFERENCE TO RELATED APPLICATION

This is a Divisional of application Ser. No. 07/843,757 filed on Feb. 28, 1992 now U.S. Pat. No. 5,305,923 which is a continuation of U.S. patent application Ser. No. 07/752,406 filed Aug. 30, 1991 now abandoned and having the same title, which was in turn a continuation-in-part of U.S. patent application Ser. No. 07/634,857 filed Dec. 27, 1990 now abandoned and having the same title, which was in turn a continuation-in-part of U.S. patent application Ser. No. 07/534,601 filed Jun. 6, 1990, with the same title, now abandoned, and is also a continuation-in-part to U.S. patent application entitled "Progressive Cavity Pump" filed Jun. 14, 1991, Ser. No. 07/715,433, now abandoned.

BACKGROUND OF THE INVENTION

1. Field of Invention

This invention relates to beverage dispensing and in particular to a postmix juice dispensing system for dispensing a finished beverage from a pliable concentrate at or near freezer temperatures with no or minimal conditioning.

2. Description of the Prior Art

Postmix juice dispensing systems are known. Orange juice concentrate, for example, is distributed frozen. Restaurants remove concentrate from the freezer and thaw the concentrate in a cooler prior to dispensing. The restaurant personnel has to estimate its juice requirements at least two days in advance and place sufficient concentrate in its cooler. If the restaurant's estimates are incorrect or if someone forgets, the restaurant will run out of thawed concentrate. Also, there is often a limited amount of cooler space available for thawing orange juice concentrate. When a restaurant runs out of thawed concentrate, juice can no longer be sold or else measures are sometimes taken to quickly thaw frozen concentrate and such measures often are inefficient and ineffective and also sometimes affect the taste of the resulting product. Orange juice concentrate has typically been 3+1 concentrate (meaning that it is to be mixed 1 part concentrate to 3 parts of water to be reconstituted), which has an ice point of about 17° F. At freezer temperatures (about −25° F. to 10° F.) this product is not pliable and will not flow.

It is an object of the present invention to provide a postmix juice dispensing system for dispensing with concentrate at or near freezer temperatures with little or no conditioning.

It is another object of this invention to provide a postmix beverage dispensing package for frozen concentrate.

It is a further object of this invention to provide a one-piece, integral concentrate-pump package that includes both a concentrate container and a positive displacement metering pump.

SUMMARY OF THE INVENTION

A postmix beverage dispensing system for dispensing a finished beverage directly from a pliable concentrate at or near freezer temperatures with no or minimal conditioning. The beverage dispensing system of this invention includes placing a one-piece, unitary package including a concentrate container and a positive displacement metering pump into a dispenser such that the pump connects to a motor in the dispenser, connecting a mixing nozzle to the pump outlet, and connecting a water line to the mixing nozzle. The concentrate in the concentrate container is also packed into the pump inlet which is open to the concentrate. The concentrate is then pressurized by an air drive system acting on a piston in the concentrate container. When it is desired to dispense a beverage, the pump motor operates the pump to force metered quantities of concentrate into the mixing nozzle where it thoroughly mixes with water while flowing through a static mixer. The finished beverage is dispensed from the static mixer into a cup.

When it is desired to replace the concentrate container either with a full one or with a different product, the one-piece, integral package including the concentrate container and the metering pump is removed and replaced with a different package. The mixing nozzle which has been attached to the pump can also be removed with the one-piece package. Thus, because all product contact surfaces are disposable, the dispenser requires virtually no cleanup or sanitization, and a rapid flavor change can be made.

This invention includes providing concentrate of various juice products such as orange juice or apple juice that have low ice points, down around 0° F., so that the concentrates will be pliable at or near freezer temperatures. For example, a preferred orange juice product for this invention is 5+1 concentrate, although any desired ratio up to about 7.5+1 could be used. The reduced amount of water in 5+1 concentrate (compared to presently used 3+1) prevents a phase change or freezing, at freezer temperatures as low as 0° F. or somewhat lower. The 5+1 concentrate at 0° F. does not readily flow by gravity. A container of 0° F. product can be inverted and no product will flow out. Also, the product is so thick that a pump's suction cannot pull product from the container. However, the product is still pliable and can be used in this invention. For example, for an orange juice concentrate having an ice point of 1° F. and located in a freezer at 4° F., the package can go directly from the freezer to the dispenser with no conditioning (heating) and beverage can be immediately dispensed therefrom. If the product is apple juice at an ice point of 0° F. and located in a freezer at −5° F., then a brief conditioning to bring the package to 0° F. would be required before placing the package in the dispenser. When no conditioning is required, the package is put directly from the freezer into the dispenser. The term "minimal conditioning" means heating the concentrate up to a temperature of no more than 10° F. The term "directly" is hereby defined for use in this application as meaning without first heating the concentrate or forcing the concentrate through a heat exchanger. The term pliable is used in its normal meaning. A 5+1 orange juice concentrate, for example, has a reduced amount of water such that at or near 1° F. it is pliable and although it will not readily flow by gravity or by a pump's suction, it will flow under pressure.

BRIEF DESCRIPTION OF THE DRAWINGS

The present invention will be more fully understood from the detailed description below when read in connection with the accompanying drawings wherein like reference numerals refer to like elements and wherein.

3

Figure 1:
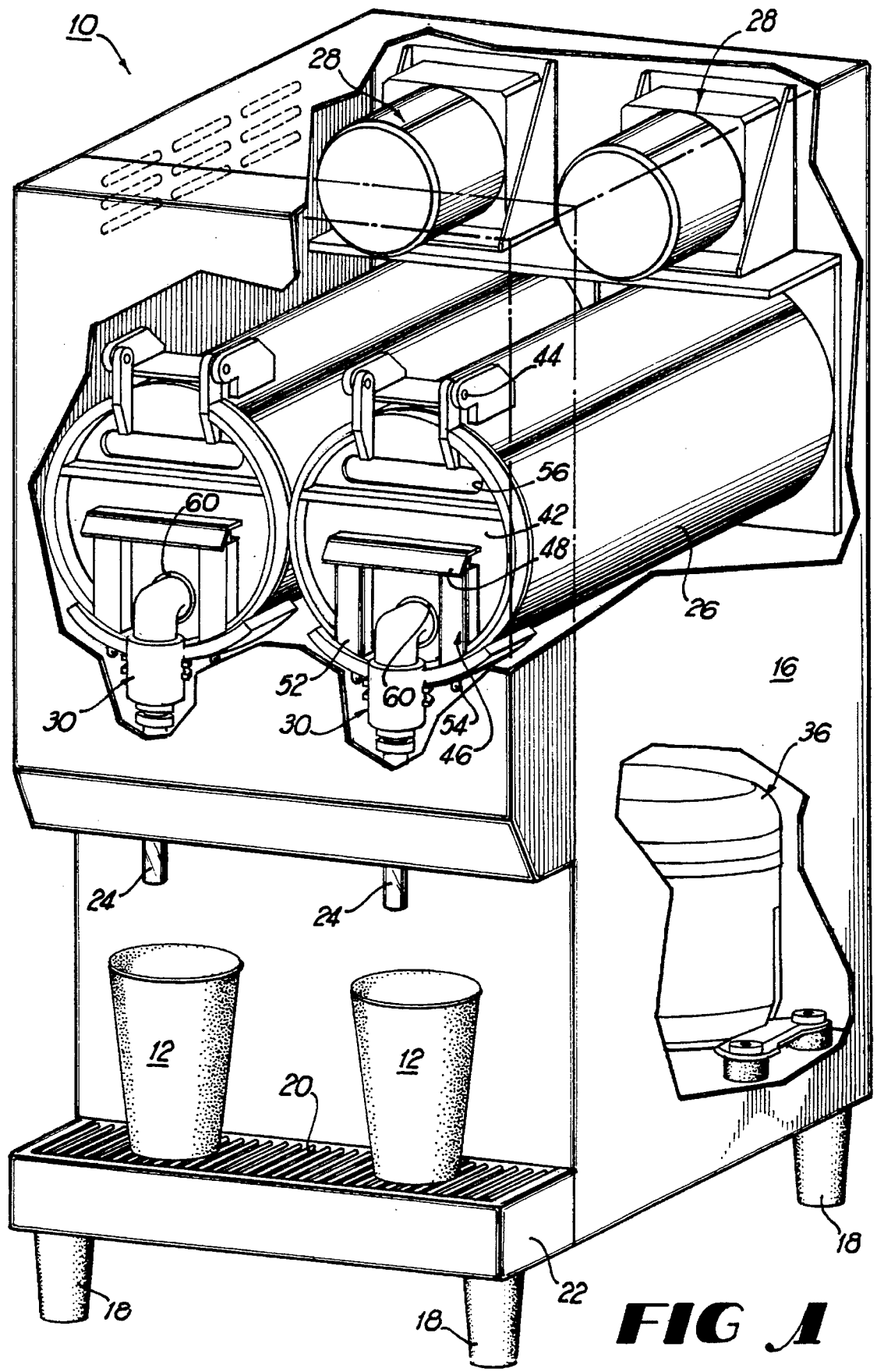
FIG. 1 is a partly broken-away front perspective view of a dispenser accordingly to the present invention.
Figure 4:
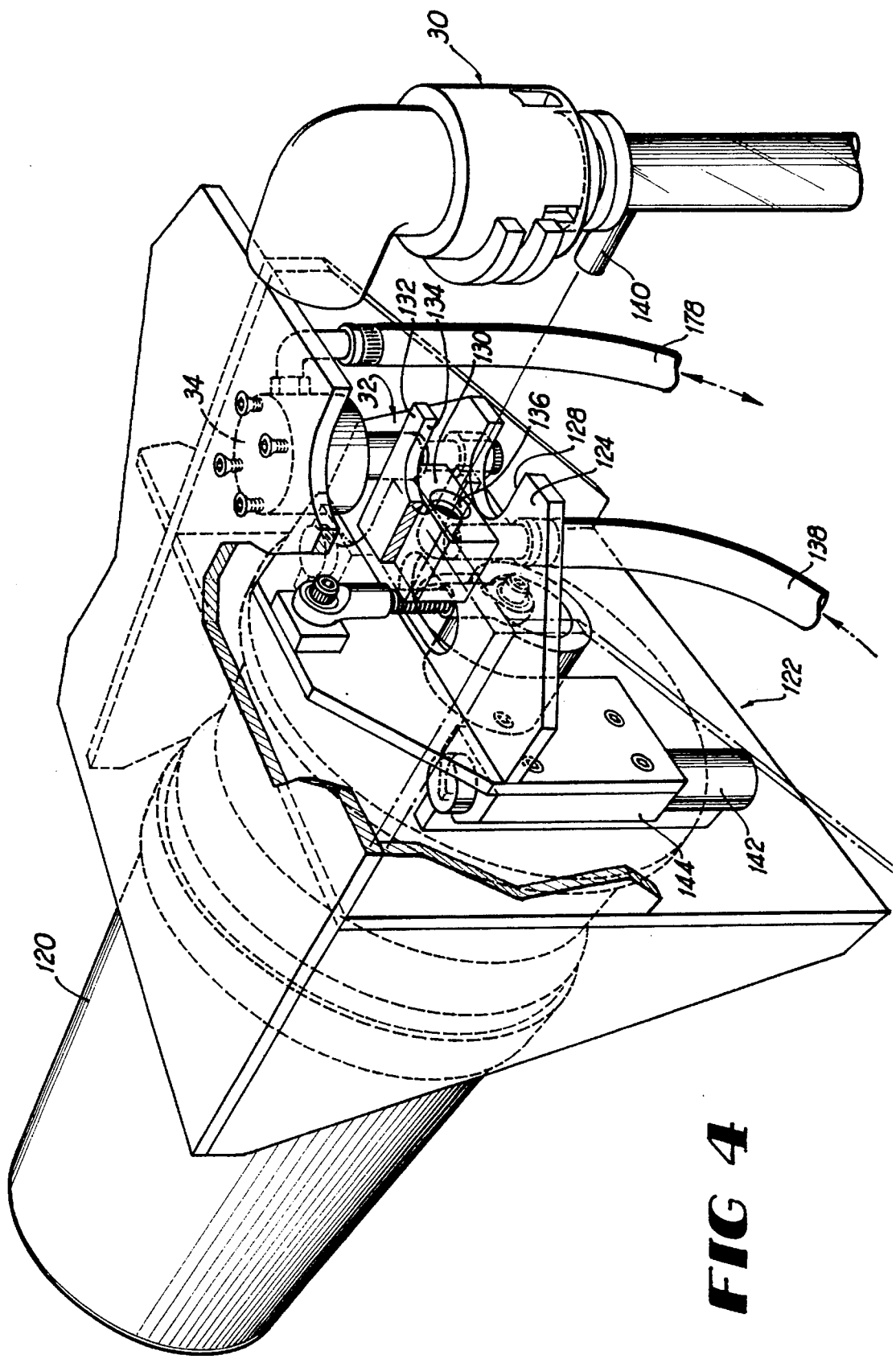
Figure 5:
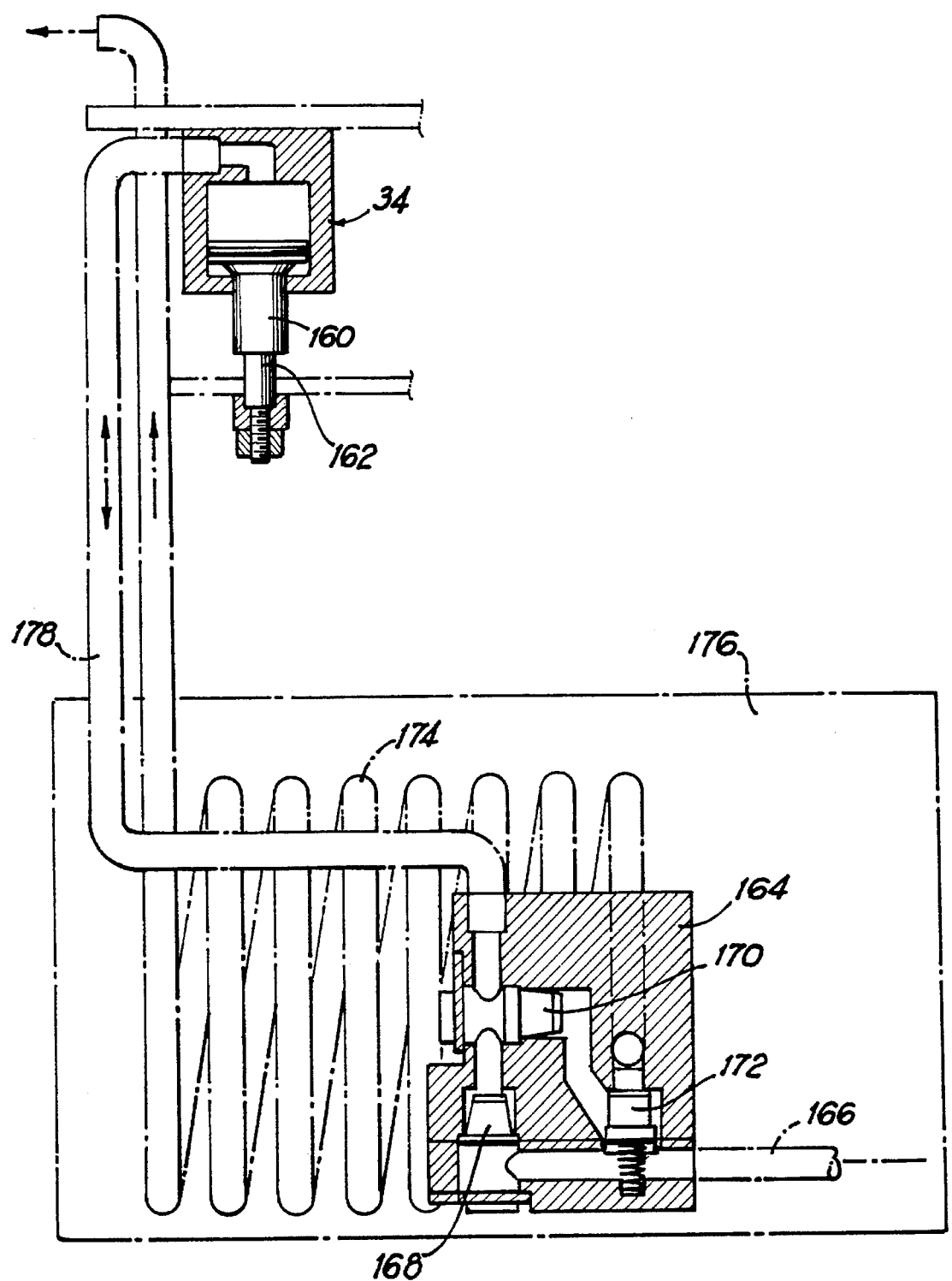
Figure 6:
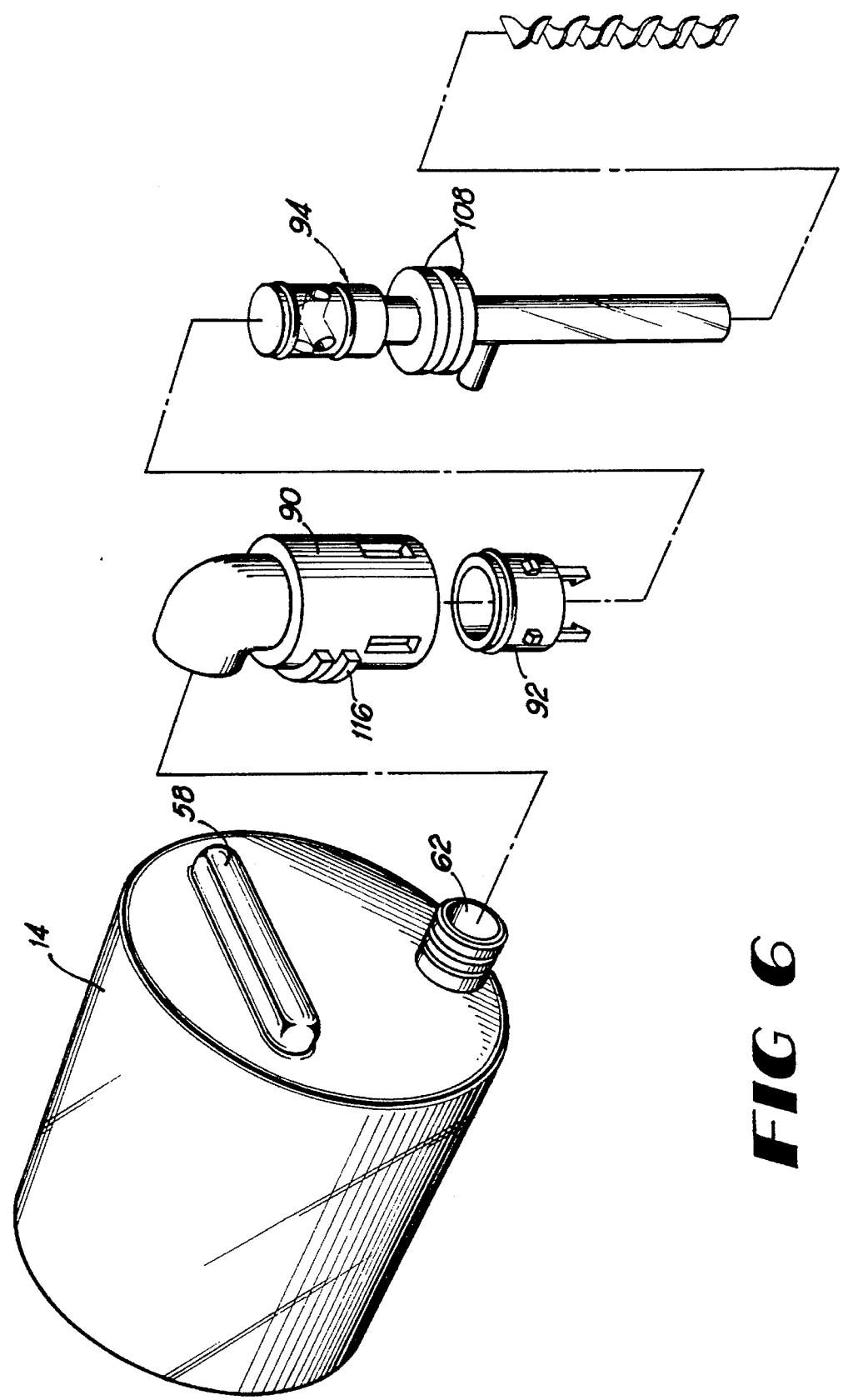
Figure 8:
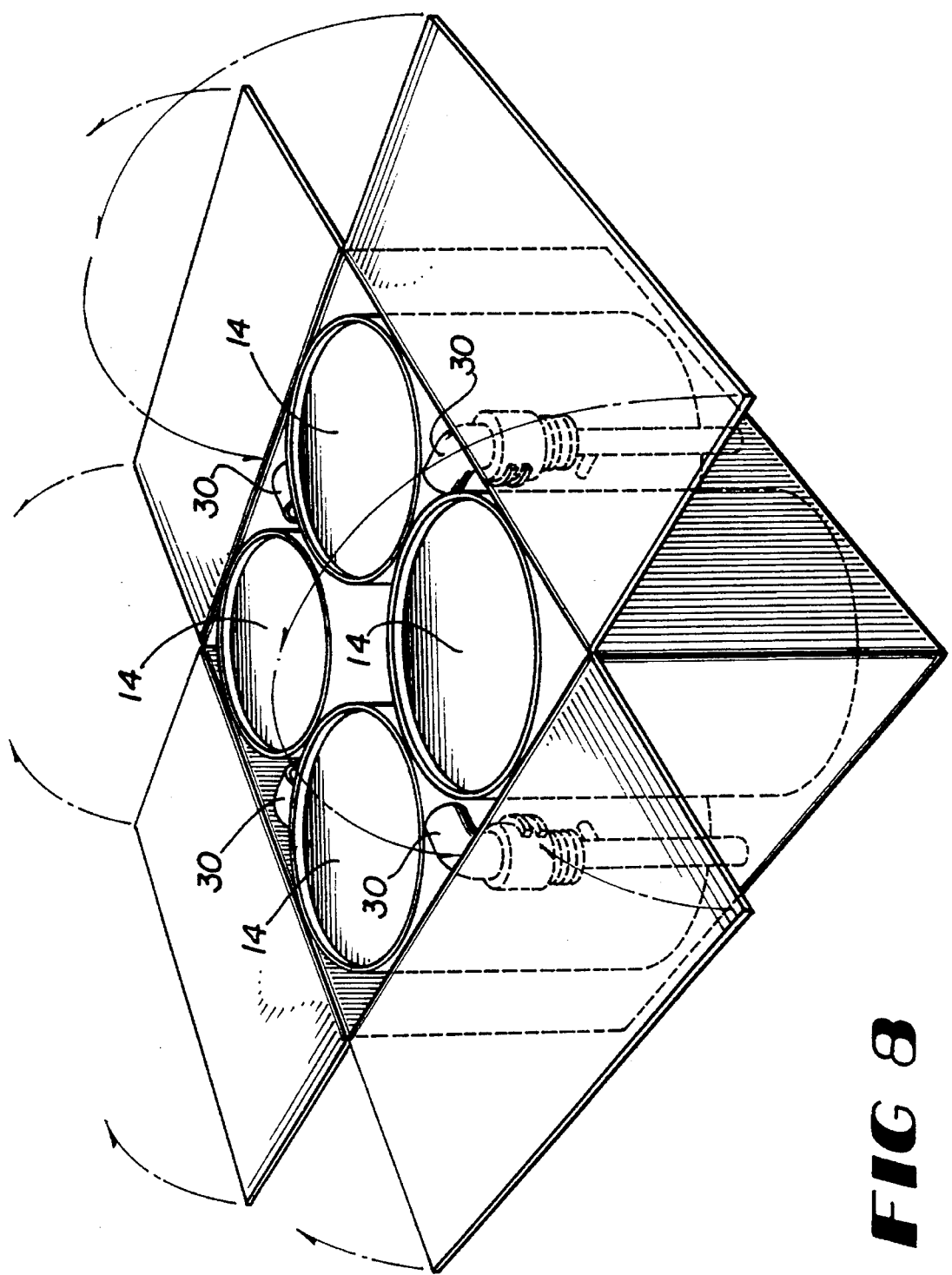
Figure 9:
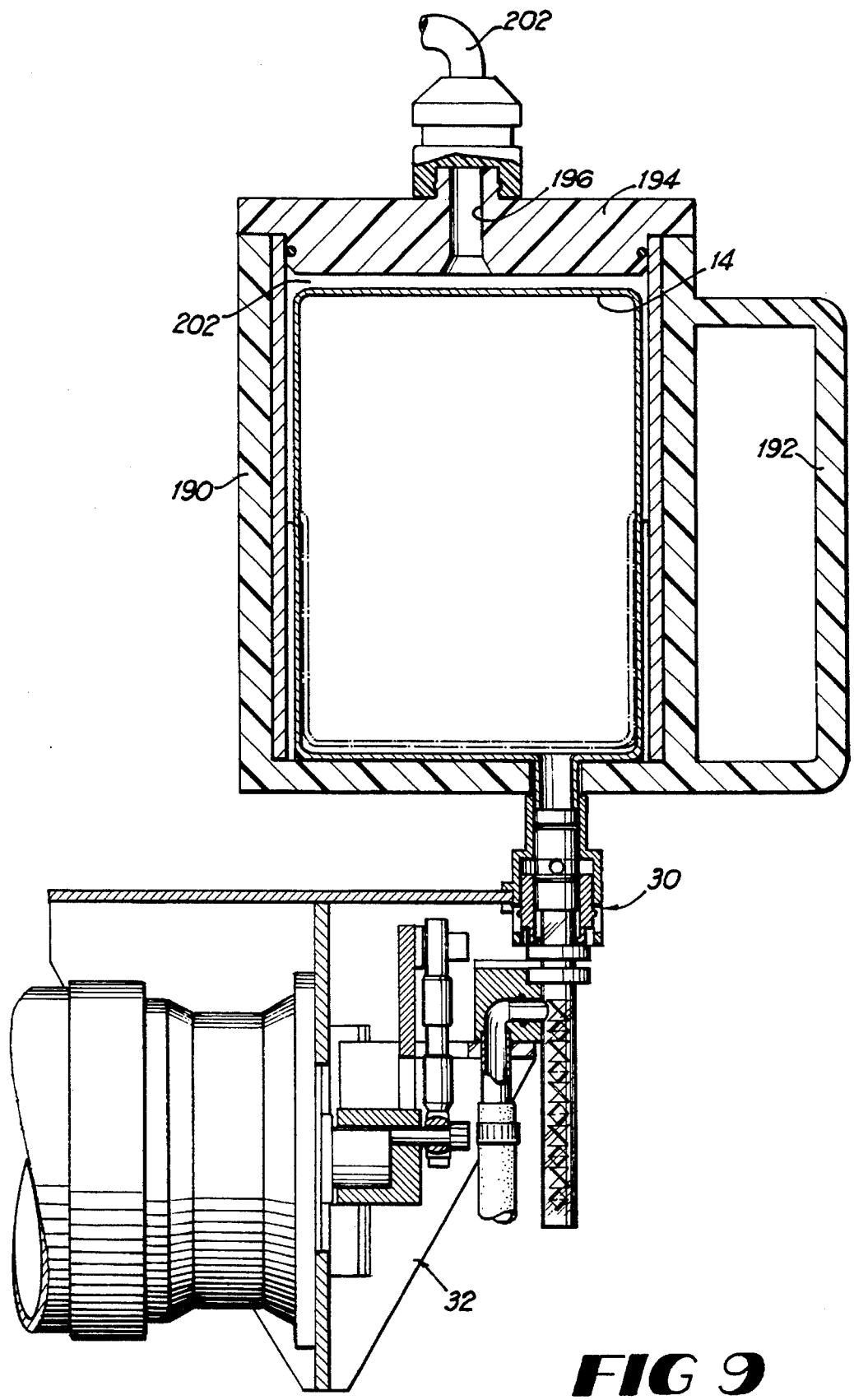
Figure 11:
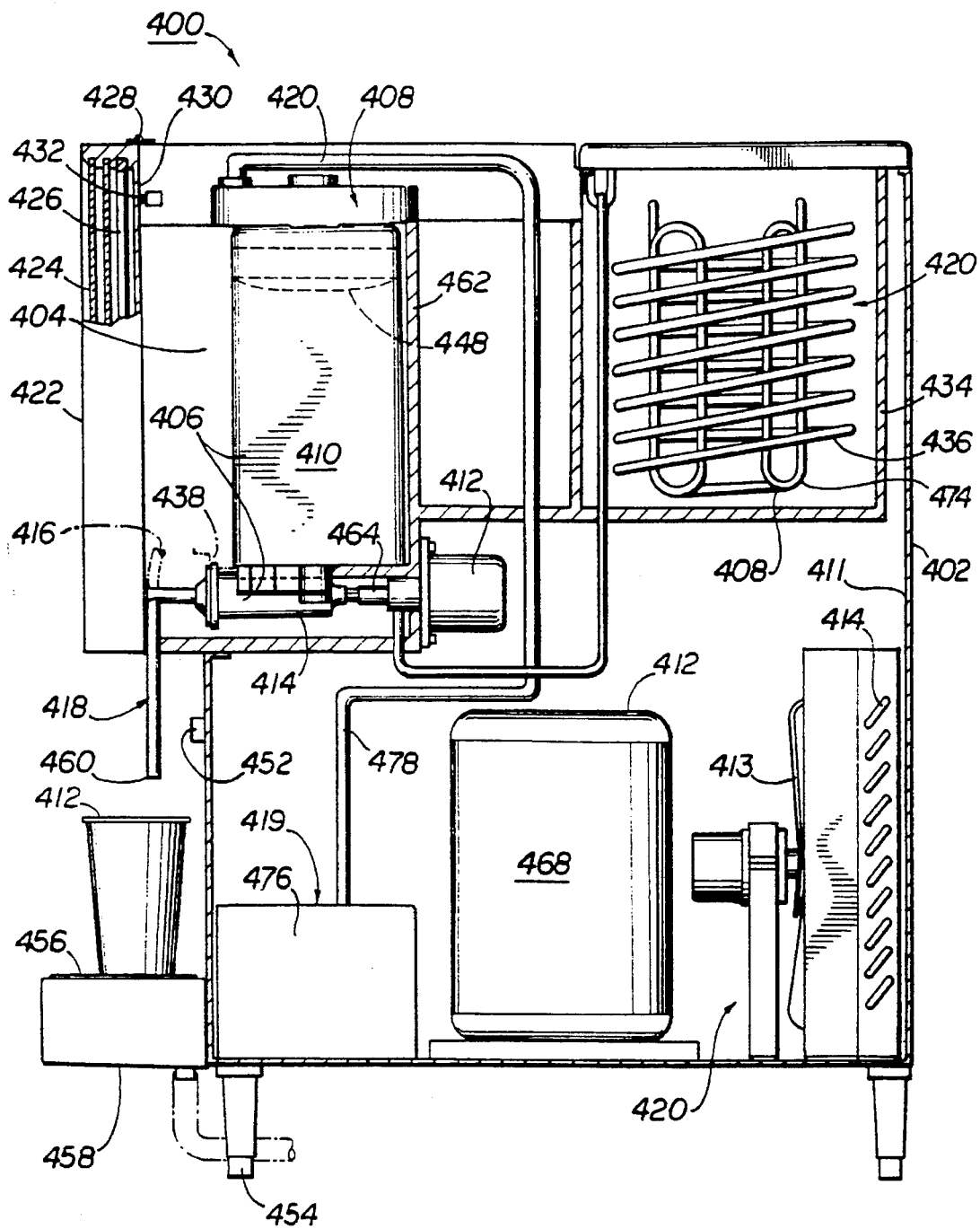
Figure 12A:
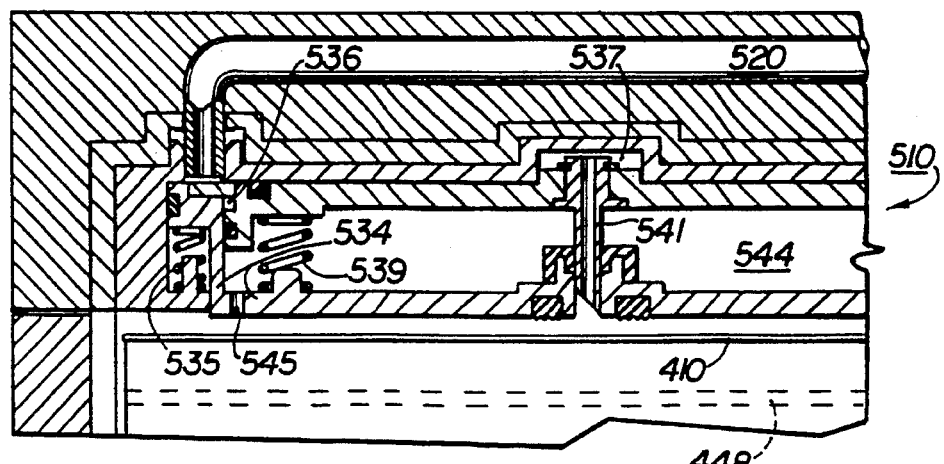
Figure 12B:
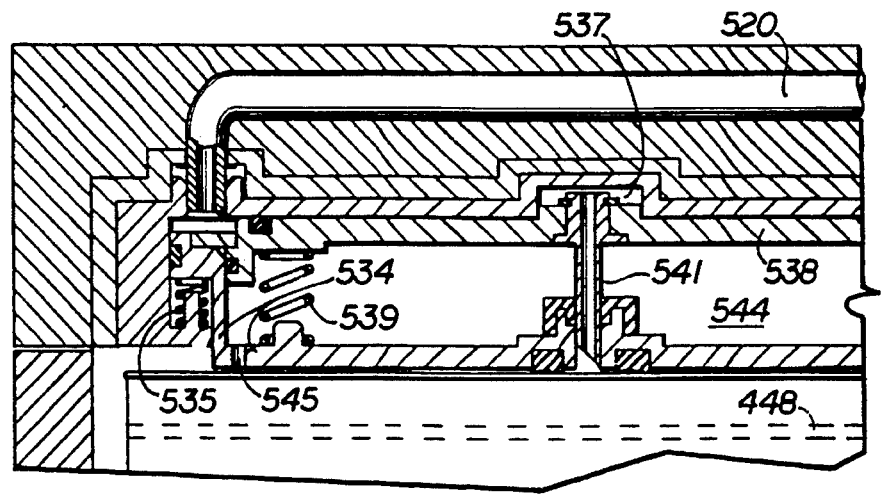
Figure 12C:
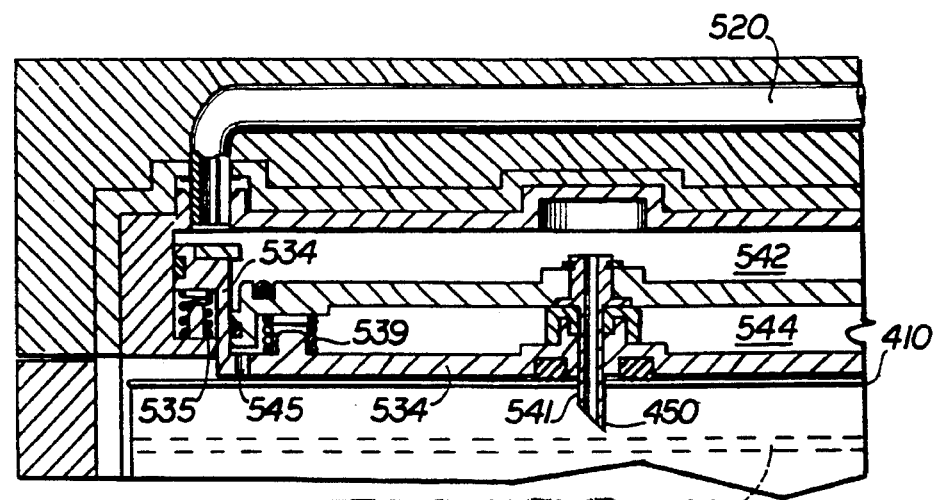
Figure 13A:
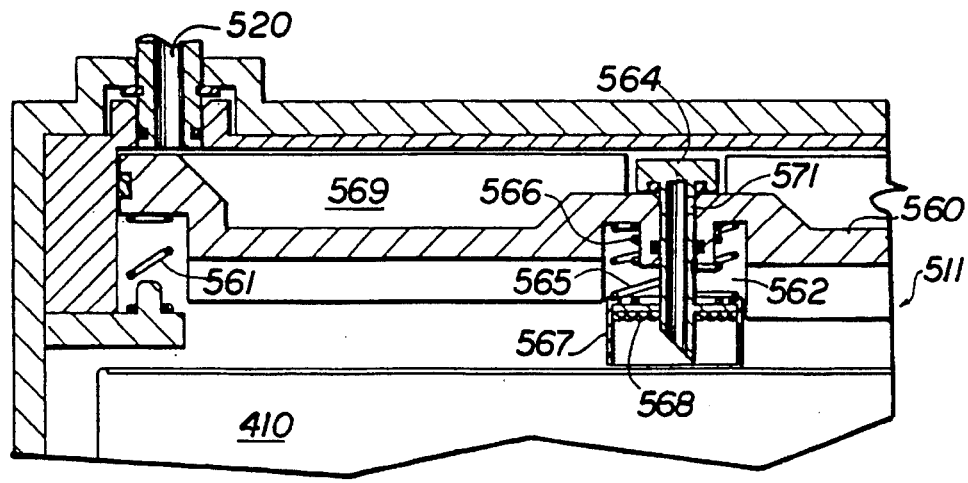
Figure 13B:
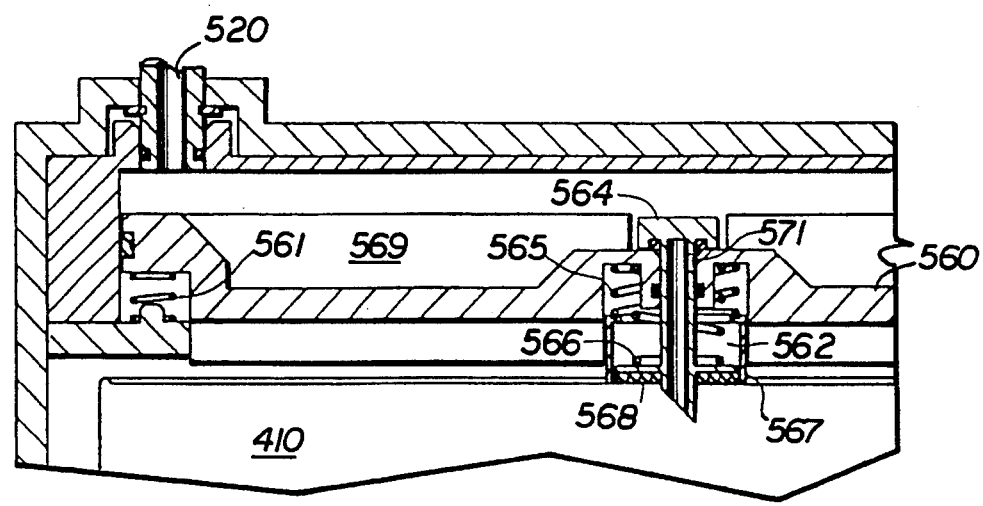
Figure 13C:
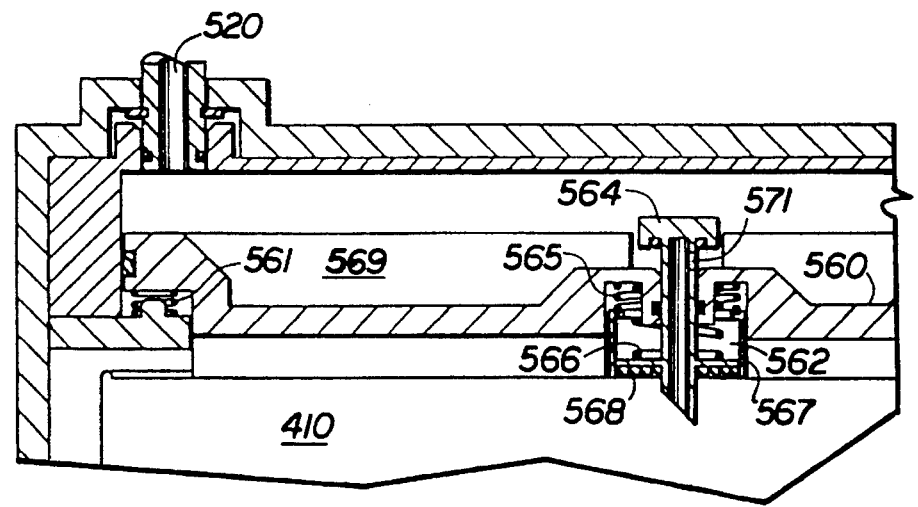
Figure 14:
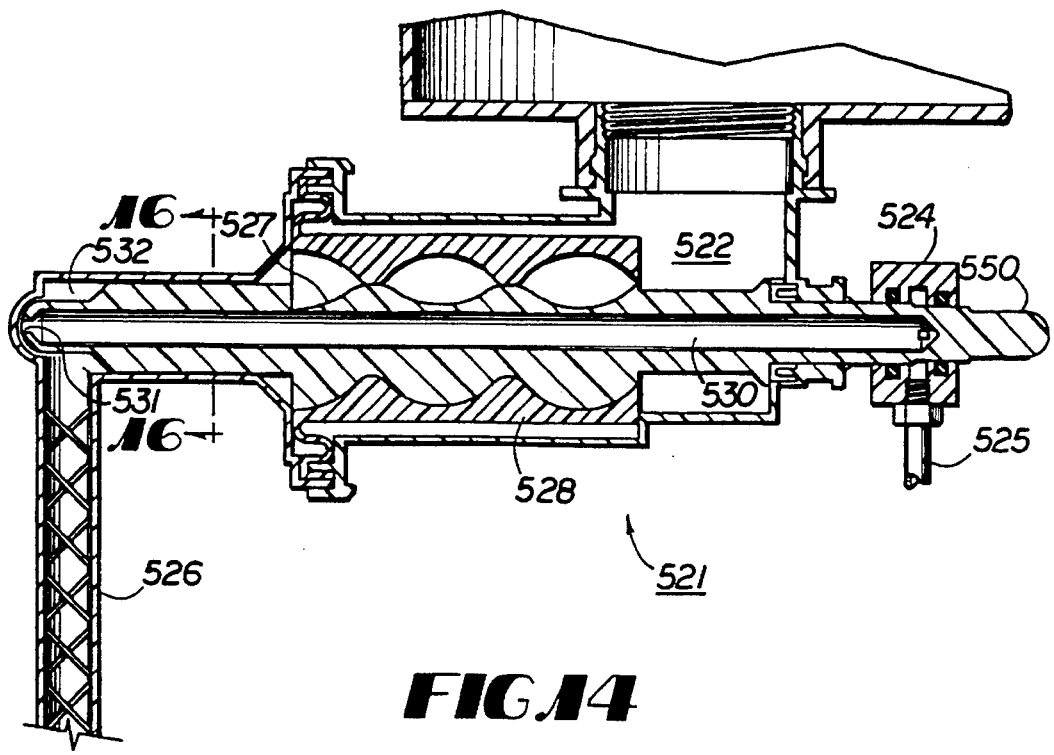
Figure 15:
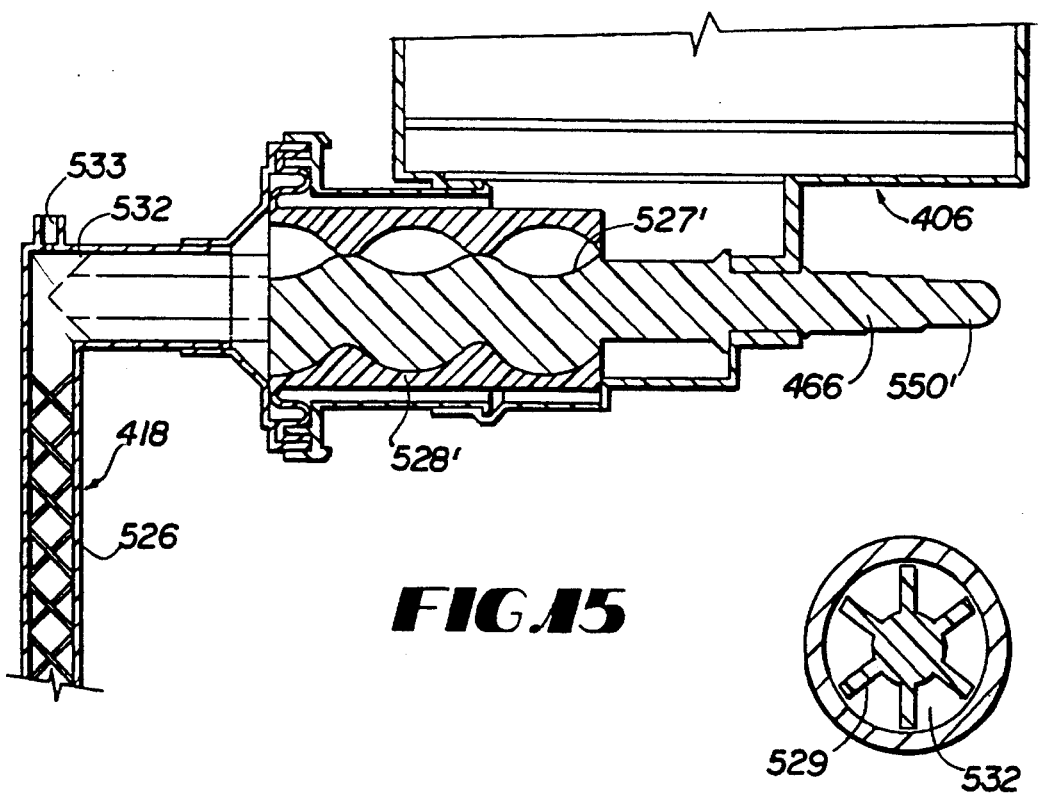
Figure 16:
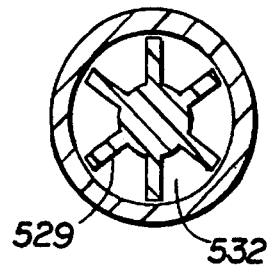
Figure 17:
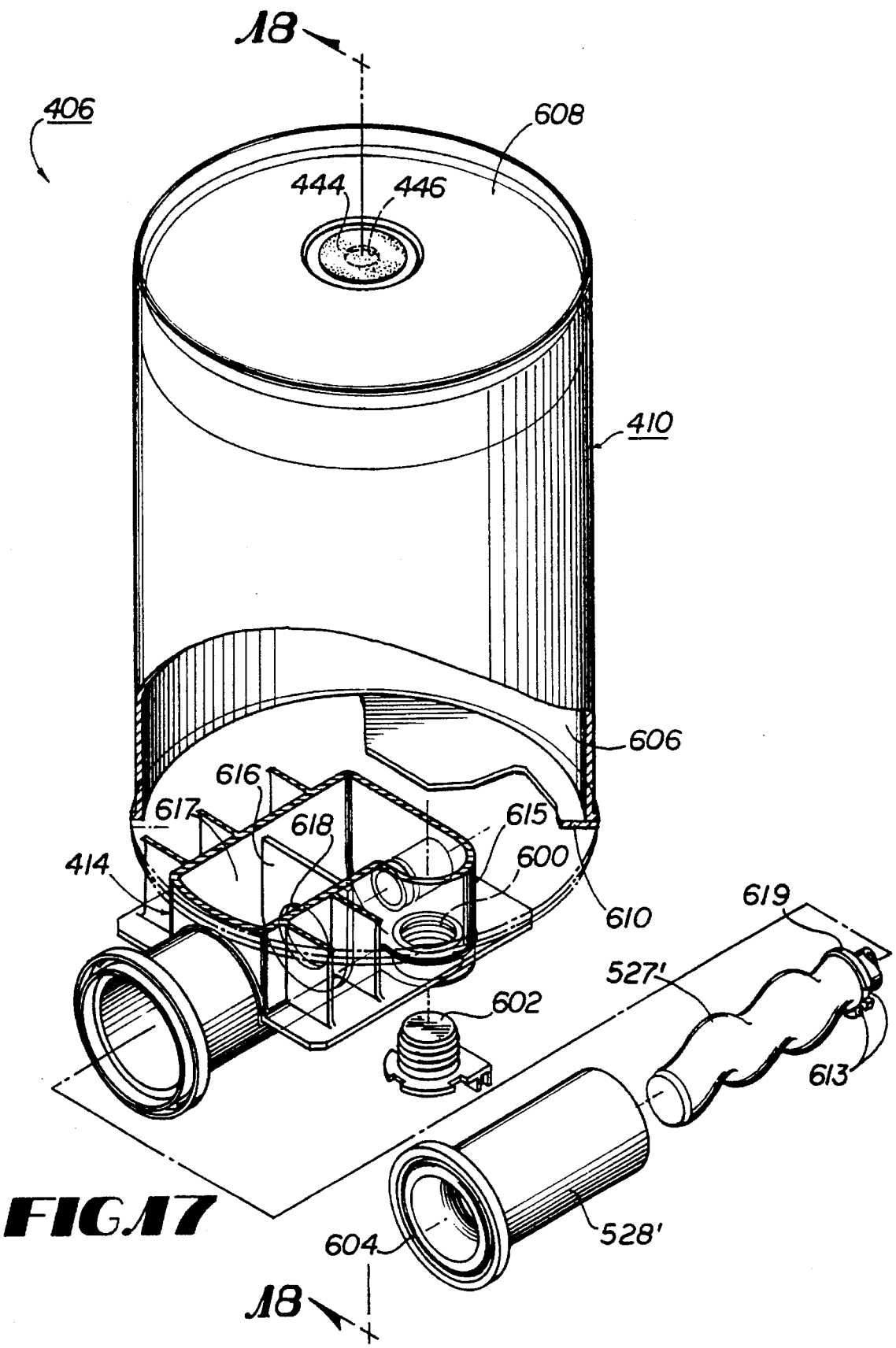
Figure 18:
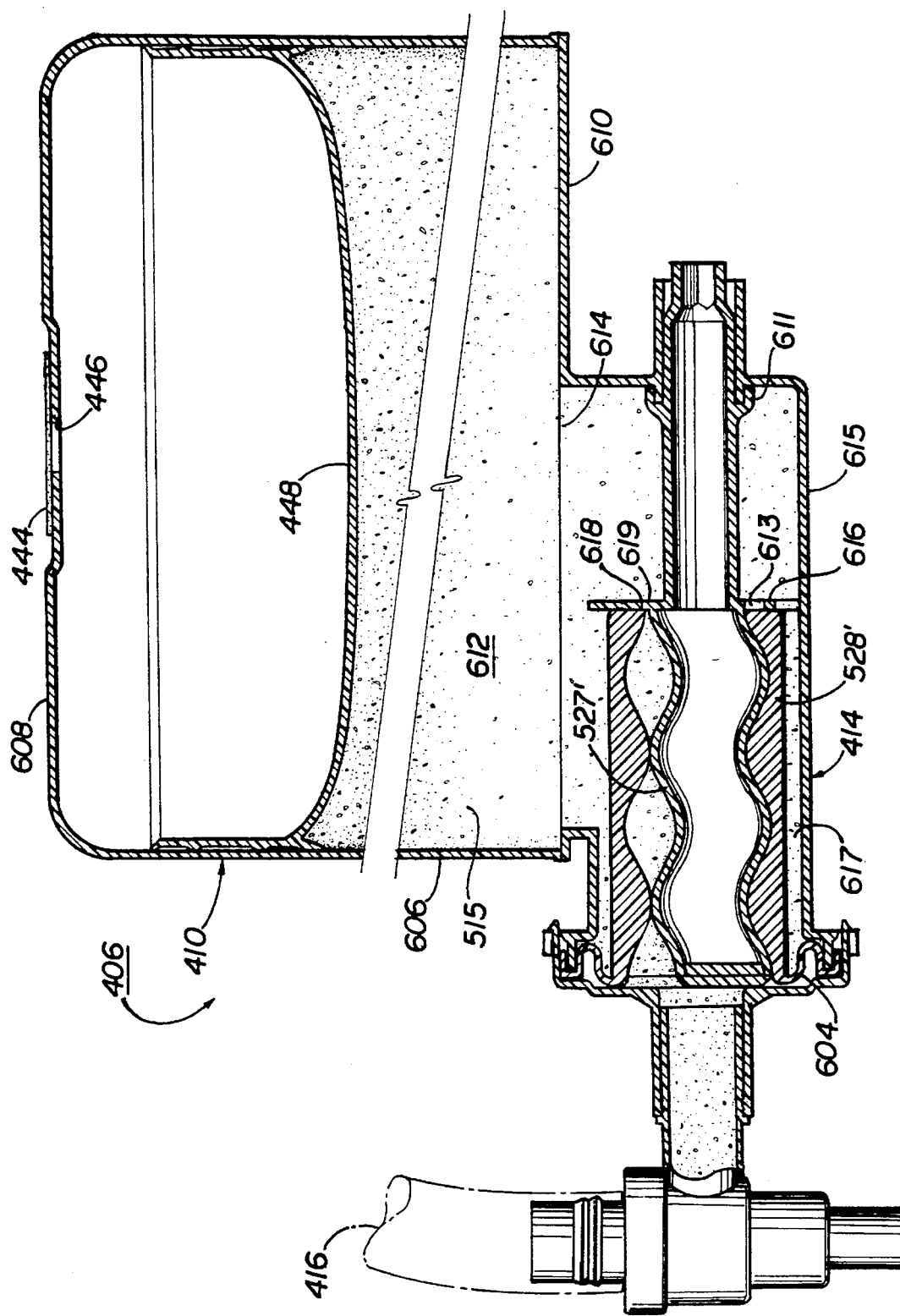

FIG. 4 is a partly broken away perspective view of the pumping mechanism of the dispenser of FIG. 1;

FIG. 5 is a partly cross-sectional side view showing the water pump of the dispenser of FIG. 1;

FIG. 6 is a partly exploded perspective view of the concentrate container and of the metering pump and mixing nozzle used in the dispenser of FIG. 1;

FIGS. 7A–7G are partly cross-sectional side views through the metering pump and mixing nozzle showing the operation thereof;

FIG. 8 is a partly broken away perspective view of the concentrate container and metering pump as they are packaged together;

FIG. 9 is a partly schematic side view of an alternate embodiment of this invention;

FIGS. 10A, 10B, 10C and 10D are partly cross-sectional partial side views through a preferred embodiment of a metering pump, showing the operation thereof;

FIG. 11 is a partly cross-sectional, side view of another embodiment of a dispenser according to this invention;

FIGS. 12A–12C are cross-sectional side views of an air drive assembly in its unpressurized, partially pressurized, and fully pressurized operating positions;

FIGS. 13A–13C are cross-sectional side views of another air drive assembly in its unpressurized, partially pressurized and fully pressurized operating positions;

FIG. 14 is a cross-sectional side view of a progressive cavity pump which can be permanently mounted in the dispenser of FIG. 11;

FIG. 15 is a cross-sectional side view of a disposable concentrate container and progressive cavity pump integral therewith that can be used in the dispenser of FIG. 11;

FIG. 16 is a section view taken along lines 16—16 of FIG. 14;

FIG. 17 is a partly broken-away perspective view of the one-piece, unitary package of this invention;

FIG. 18 is a cross-sectional view taken along line 18—18 of FIG. 17;

FIG. 19 is an exploded, isometric view of a swash plate pump (or rotary piston pump) useful in the dispenser of this invention; and FIG. 20 is a partly cross-sectional view of a unitary package including a disposable concentrate container, the rotary piston pump of FIG. 19, and a mixing nozzle useful in the dispenser of this invention.

DETAILED DESCRIPTION OF THE PREFERRED EMBODIMENT

With reference now to the drawings, FIGS. 1–8 show a first embodiment of a beverage dispenser 10 according to the present invention for dispensing a beverage, such as orange juice, into a cup 12. The dispenser 10 mixes water with concentrate which is supplied in a concentrate container 14 (see FIGS. 3 and 6) and which is at freezer temperature (such as in the range of from about −10° F. to +5° F.). The container 14 is taken directly from the freezer and inserted into the dispenser 10 without the need for thawing. The dispenser 10 can immediately proceed to dispense beverages from this frozen concentrate.

The dispenser 10 includes a housing 16 on legs 18, a cup support 20, a drip tray 22, and a pair of dispensing nozzles 24. The dispenser 10 is a two flavor dispenser, however, a dispenser according to this invention can include any desired

4 number of dispensing mechanisms for dispensing one, two, three or more different beverages. Because each of the dispensing mechanisms are the same, only one will be described herein.

The dispenser 10 includes a canister 26 for holding a concentrate container 14, pressurizing means 28 for pressurizing the concentrate in the canister, a disposable combination metering pump and mixing nozzle 30, a metering pump actuating means 32, and a water pump 34 for pumping water to the mixing nozzle for mixing with the concentrate to produce the beverage. The dispenser 10 also includes a refrigeration system 36.

Figure 2:
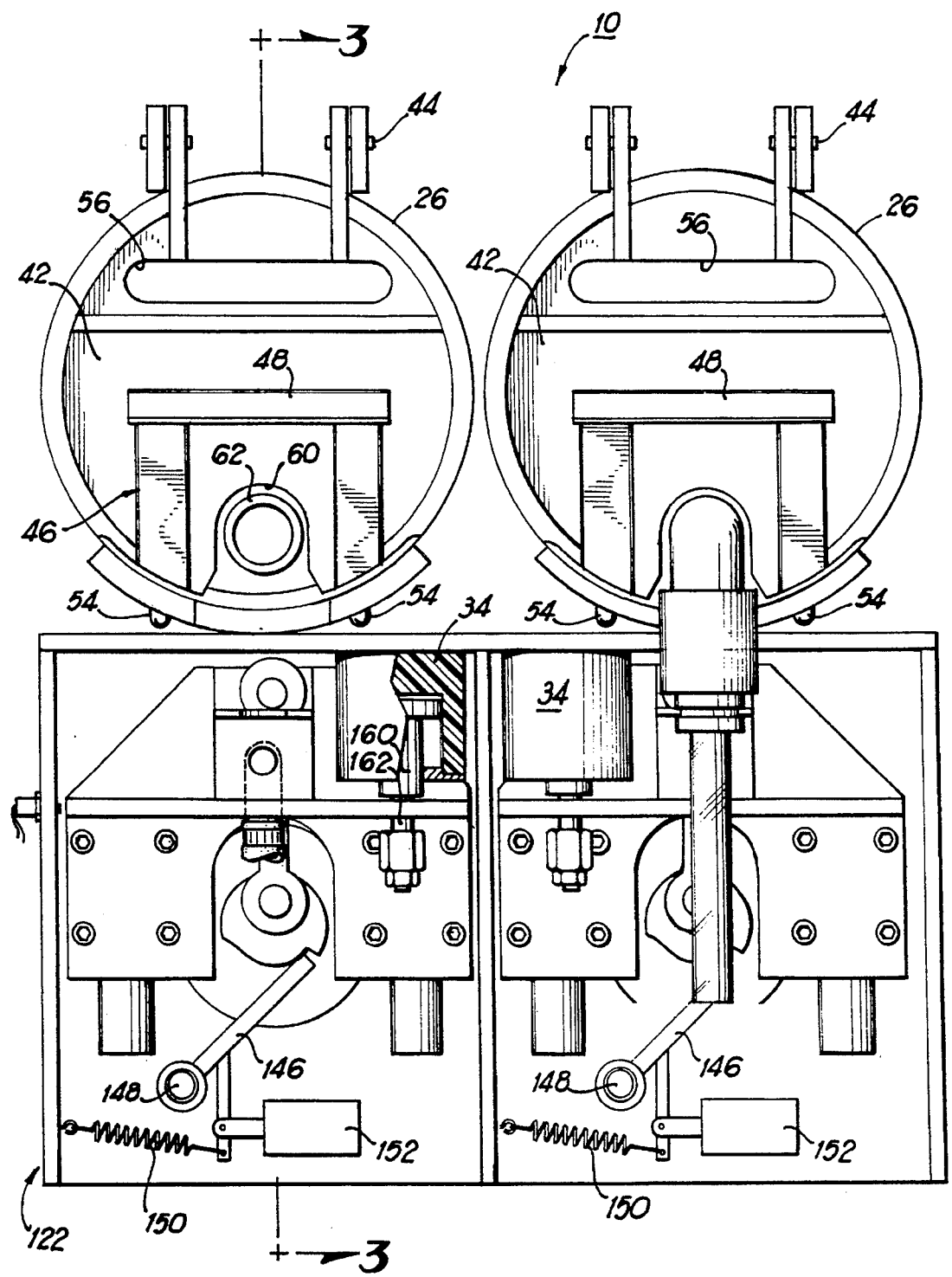
FIG. 2 is a partial front view showing the canister and pumping mechanism of the dispenser of FIG. 1.
Figure 3:
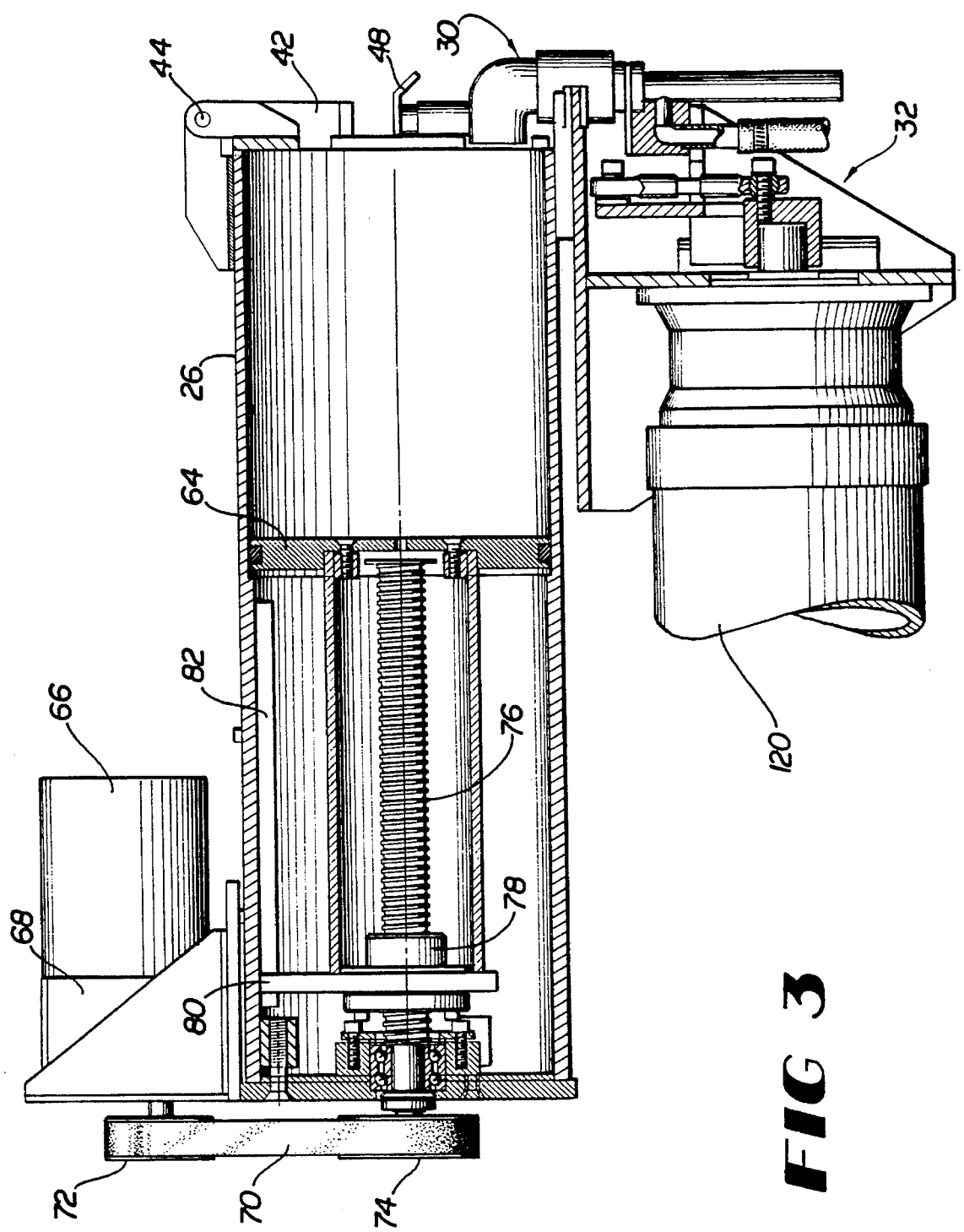
FIG. 3 is a partly cross-sectional side view through the canister and pumping mechanism of the dispenser of FIG. 1.

The canister 26 and the pressurizing means 28 will now be described. Referring to FIGS. 1–3, the canister 26 is preferably a stainless steel cylinder enclosing a concentrate chamber 38 and having an opening 40 through which a concentrate container 14 is inserted into the chamber 38. After the concentrate container 14 is inserted into the chamber 38, a cover 42 is closed and locked. The cover 42 is hingedly connected to the canister by means of a hinge 44 and also includes a lock 46. The lock includes a handle 48 connected to a pair of pins 50 which extend through a pair of supports 52 connected to the cover 42 and project through a stationary plate 54 adjacent to the cover 42. It is noted that the cover 42 preferably includes an opening 56 therein to accommodate a handle 58 on the concentrate container 14. The cover 42 also includes an opening 60 to accommodate a discharge spout 62 of the container 14. The refrigeration system 36 includes a cooling jacket 37 around each canister for keeping the canister 26 at a desired temperature selected from the range of from about 0° F. to 40° F. The refrigeration system 36 also includes a water bath 176 (see FIG. 5).

The other end of the concentrate chamber 38 is formed by a piston 64 of the pressurizing means 28. The pressurizing means 28 include a motor 66, a gear box 68, a belt 70 extending between a pair of pulleys 72 and 74, a screw-threaded rod 76, and an internally screw-threaded collar 78 connected to the piston 64. Connected to the collar is an arm 80 having a key-way slot therein associated with a rod 82 to prevent the collar 78 from turning with the screw-threaded rod 76 so that rotation of the rod 76 will cause linear movement of the piston 64. The piston 64 preferably applies about 40 psig of force on the concentrate.

The concentrate metering pump and mixing nozzle unit 30 will now be described. The pump and nozzle unit 30 is a single integral and disposable unit which comes with the concentrate container 14 and which after depletion of the concentrate in the container 14 is disposed of along with the concentrate container. In this way, all of the product contact surfaces are disposed of, which provides the dispenser 10 with the important advantage of requiring virtually no cleanup or sanitization. The pump and nozzle unit 30 is made up of the three separate pieces of a pump housing 90, an annular piston 92 and a valve and mixing nozzle 94. The pump housing 90 is L-shaped in configuration and includes an inlet conduit 96 and a concentrate pumping chamber 98. The annular piston 92 is captured for reciprocating movement inside of the pumping chamber 98. The valve and mixing nozzle 94 are slideably movable inside of the annular piston 92 and includes a valve opening 100 and a concentrate discharge conduit 102 which communicates with the valve opening and through which concentrate is forced from the pumping chamber 98 into the mixing nozzle 104, which preferably includes a static mixer 106. The valve and mixing nozzle 94 include a pair of spaced apart flanges 108 in which the yoke 134 of a metering pump actuating means fits to cause vertical reciprocating movement of the valve and mixing nozzle to create the pumping action of the metering pump, as shown in FIGS. 7A–7G. FIG. 7A shows the top dead center position which is the start/stop position. FIG. 7B shows the downward movement of the valve and closing of the valve opening 100. FIG. 7C shows the valve engaging the piston 92 such that further downward movement of the valve also moves the piston down opening and enlarging the pumping chamber 98, as shown further in FIG. 7D. FIG. 7E shows the upward movement of the valve closing the intake to the pumping chamber 98. FIG. 7F shows the further upward movement opening the valve opening 100 and the contact with the piston 92 after which further upward movement as shown in FIG. 7G compresses the pumping chamber, forcing concentrate through the valve opening 100 and out of the mixing nozzle 94.

The pump housing 90 also includes a pair of spaced apart flanges 116 in-between which a stationary plate 117 fits to hold the housing 90 stationary.

The mixing nozzle portion of the valve and mixing nozzle unit member 94 includes an inlet port 110, a beverage dispensing outlet 112 and a water inlet port 114 for receiving pressurized water pumped to the mixing nozzle 94 from the water pump 34.

The metering pump actuating means 32 will now be described. This actuating means includes a motor 120 and a slider crank mechanism 122. The mechanism 122 includes a vertically sliding plate 124. Connected to the vertical plate is a first horizontal plate 126 having a large cutout 128 to accommodate the pump and nozzle unit 30 without touching it, a water passage block 130 connected to the plate 126, and a second horizontal plate 132 connected to the block 130 and having a yoke 134 to be received in between the pair of spaced apart flanges 108 on the valve and mixing nozzle 94. The water block 130 includes a water passageway 136 therein connected at one end to a water line 138 leading from the water pump 34 and at the other end being connected to a coupling 140 defining the water inlet port to the mixing nozzle. The vertically reciprocating elements ride on a pair of spaced apart rods 142 in bushings 144.

The slider crank mechanism preferably has a positive stop device shown in FIG. 2 and including a stop arm 146 pivoted at 148 and held in a disengaged position as shown in the right in FIG. 2 by a spring 150. If it is desired to effect a positive stop, then a solenoid 152 is energized, which will cause the stop arm 146 to pivot to the position shown in the left in FIG. 2 to engage the slider crank mechanism to effectuate a positive stop.

The water pump will now be described with reference to FIG. 5. FIG. 5 shows the water pump 34 with a piston 160 which includes a reduced diameter section 162 which extends through a hole in the horizontal plate 126. There is a predetermined amount of play between movement of the plate and the piston because while the metering pump requires about three-fourths inch of movement for its pumping action, the water pump requires much less, preferably about one-fourth inch of movement. As shown in FIG. 5, water enters into a pumping valve 164 through an inlet line 166. The pumping valve includes two check valves 168 and 170 and a flow control 172. Water flows from the pumping valve through a heat exchange line 174 located in a water bath 176 and then to the water block 130 described above. A water line 178 extends from the pumping valve 164 to the water pump 34. It will be seen from FIG. 5 that one stroke of the water pump draws water into the water pump from the pumping valve and on the pressure stroke forces water through the pumping valve to the water block 130.

The dispenser 10 will have several delays. When a new container 14 is inserted the dispenser will pressurize first, delaying pumping action. Next the pump motor will start, allowing for water pressure to be established then the pumping action will begin and the water solenoid will open which dispenses a finished beverage. Thereafter, each time a drink is dispensed the screw jack motor 120 which pressurizes the concentrate will begin about one second prior to the pumping action and water solenoid opening. A proximity switch 180 (see FIG. 2) is used to inform the system about the number of strokes made by the pumping mechanism.

FIG. 8 shows a package including a corrugated box containing four disposable concentrate containers 14 and four pump and nozzle units 30. As noted previously, both the concentrate container and the pump and nozzle unit 30 are disposable after use. Of course, the concentrate containers can be delivered in other sizes, types and arrangements of boxes and shipping crates other than the one shown in FIG. 8.

FIG. 9 shows another embodiment of the present invention in which a canister 190, having a refrigeration jacket 192 is arranged vertically above the pump and nozzle 30. The canister 190 includes a cover 194 which is locked thereto and which includes an opening 196 therethrough. The cover includes a coupling 198 for attachment to a pneumatic line 200 for pressurizing the concentrate chamber 202 inside of the canister 190. This is an alternate method for forcing the concentrate from the concentrate container into the metering pump and mixing nozzle.

Figure 7:
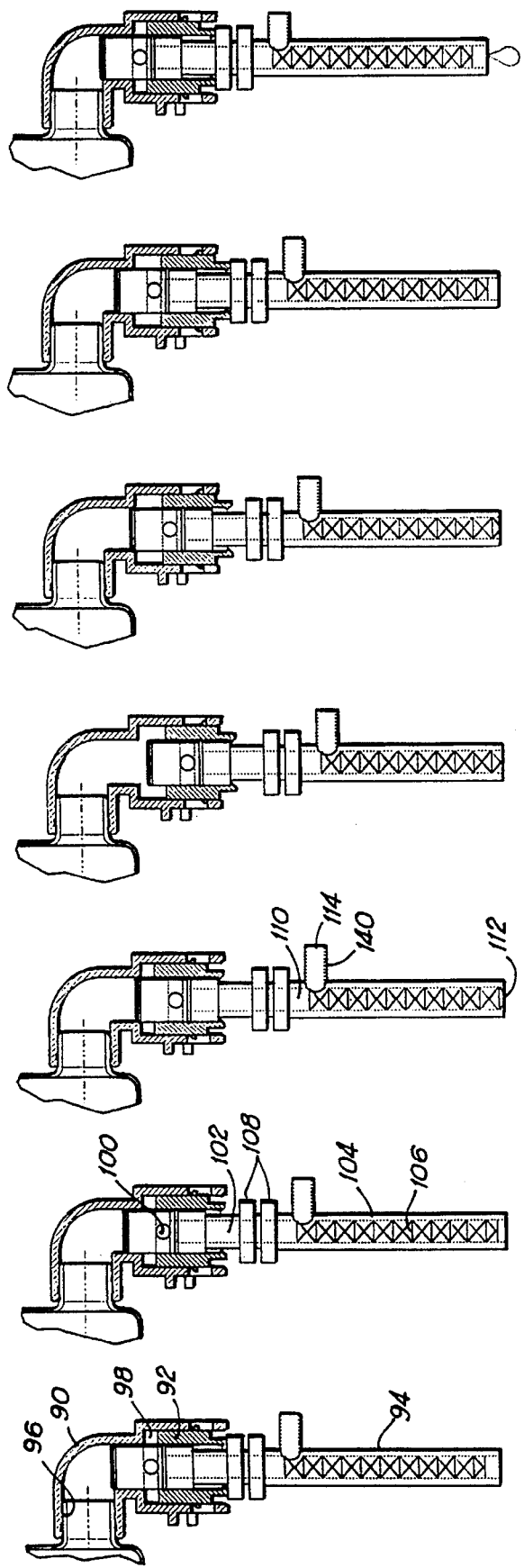

FIGS. 10A–10D, show another embodiment of a metering pump 300, similar to that shown in FIG. 7. The metering pump 300 differs from that shown in FIG. 7 in including detent insured positive stops for the piston 302. The reason is to require extra force to move the piston. This is important because since the discharge valve 304 causes the piston to move, it might do so prematurely if friction between the valve and the piston were greater than that between the piston and the housing 306. This improvement eliminates the need to have close tolerances and reduces the chance of improper volumetric metering.

It is noted that the pump 300 also allows the inlet opening 308 in the valve to remain full open throughout the dispensing portion of the metering cycle. This provides the advantage over known metering pumps of this type in which the piston goes all the way to the top of the pumping chamber 310 of improving control of the metering of the fluid by eliminating the flow restrictions through an inlet opening of decreasing area as the piston approaches the top of the chamber.

The metering pump 300 includes the stationary housing 306, the volumetric piston 302 mounted for reciprocating movement inside of the housing 306, and the discharge valve 304 mounted for reciprocating movement inside of the piston 302. The stationary housing 306 includes a liquid pumping chamber 310 therein and a liquid inlet passageway 312 in communication with the pumping chamber 310. The piston 302 is annular in shape and is mounted for reciprocating movement inside of the housing 306 and is in sliding engagement with the housing. The piston has an axially extending cylindrical valve chamber 314 therein. The discharge valve 304 is cylindrical and is mounted for reciprocating movement inside the valve chamber 314 of the piston 302. The valve 304 includes a liquid passageway 316 therethrough including a diametrical passageway 318 with inlet openings 308 on opposite sides of the discharge valve 304. The inlet openings 308 are spaced-apart from a proximal end of the valve 304. The passageway 316 also includes an axial passageway 322 connected to the diametrical passageway and extending from the diametrical passageway to a distal end of the valve 304 where the passageway 316 has its outlet end. The discharge valve 304 includes first and second axially spaced-apart piston moving means for causing the piston 302 to move only when both (1) the discharge valve 304 is moving and (2) one of said moving means is in contact with said piston. The piston 302 has a top dead center position shown in FIG. 7A and FIG. 10C wherein the piston stops short of a top wall of the pumping chamber 310 leaving an upper portion 330 of the pumping chamber 310. The discharge valve 304 is in its top dead center position when the piston is also in its top dead center position and the inlet openings 308 are located in the upper portion 308 of the pumping chamber 310, whereby the inlet openings 308 remain full open throughout the dispensing portion of the metering cycle.

The first and second piston moving means can be seen both in FIG. 7 and in FIG. 10. The first piston moving means includes a bottom shoulder 332 of the valve which contacts an annular ring 334 of the piston, and the second piston moving means includes a shoulder 336 on the valve which contacts a bottom end 337 of the piston 302.

The housing 306 includes a pair of spaced apart annular o-ring grooves 340 and 342, and the piston 302 includes an annular o-ring 344 on its outer surface (preferably molded as an integral portion of the piston 302) to require that additional force be used to move the piston. The o-ring grooves and the o-ring are located such that the o-ring mates with one of the grooves at each of the top dead center and bottom dead center positions of the piston. The friction between the valve 304 and the piston 302 is thus insufficient to cause the piston to move, such that the piston will move only when contacted by one of said piston moving means on said valve.

Figure 10D:
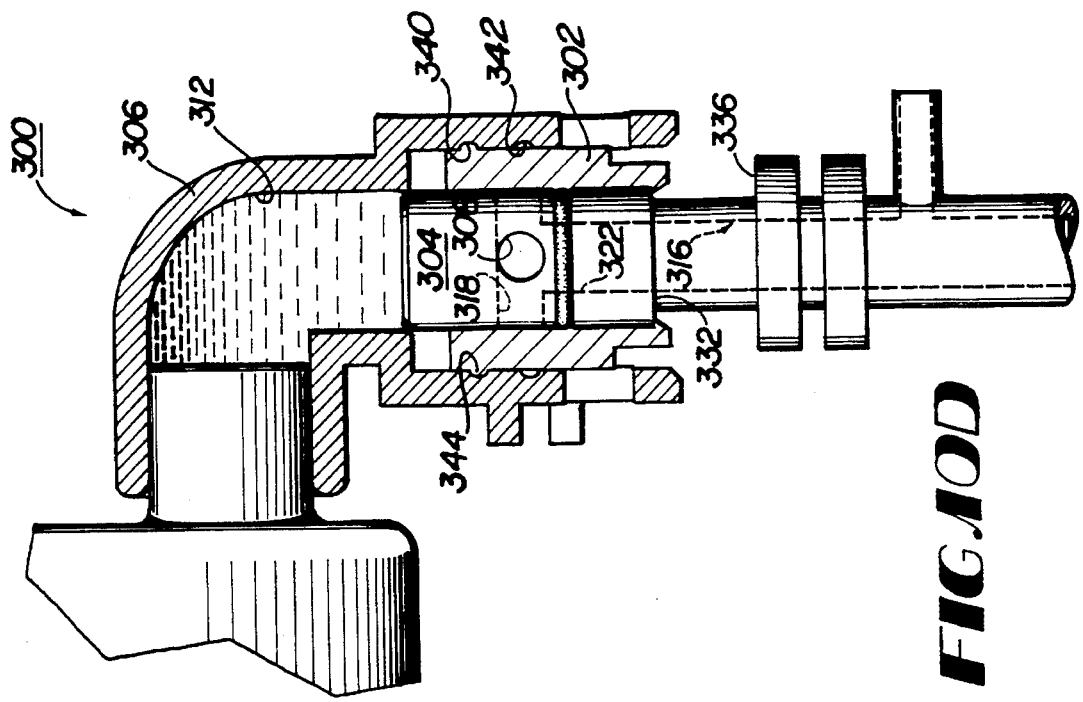
Figure 10C:
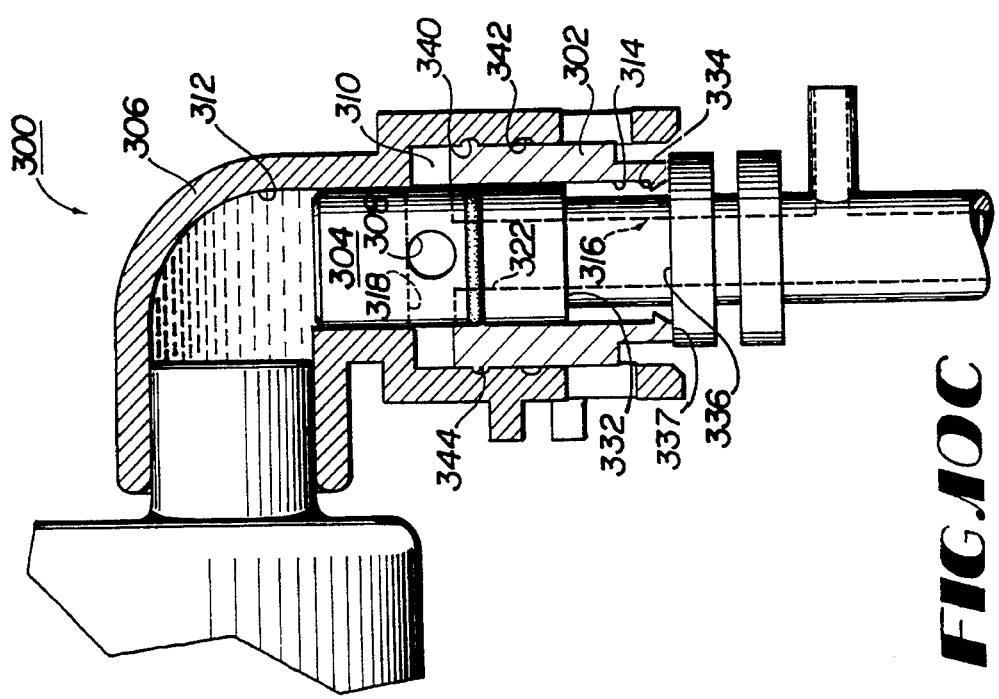

FIG. 10C shows the top dead center position and FIG. 10A shows the bottom dead center position. FIG. 10B shows the valve moving up and just starting to contact the piston, whereby further upward valve movement will cause the piston to move and the o-ring 344 to come out of the o-ring groove 342. FIG. 10D shows the valve having moved down and just contacting the piston whereby further downward valve movement will cause the piston to move.

FIGS. 11–19 show a beverage dispenser 400 according to a currently preferred embodiment of the invention. FIG. 20 shows a different metering pump (a swash plate pump) that could be used in the dispenser 400 in place of the preferred progressive cavity pump.

As will be seen, the dispenser 400 differs in certain respects from the earlier described dispenser 10. For example, dispenser 400 does not use the pressurizable canister 26, nor a mechanical pressurizing means, nor a water pump 34. The dispenser 400 only pressurizes the container to about 10–12 psig, whereas the dispenser 10 could pressurize to 40–50 psig. It is noted that the dispenser 10 of FIGS. 1–8 can dispense pliable juice concentrate at lower temperatures (for example, −15° F.) and higher viscosities (for example, up to about 13,000,000 centipoise) than can the preferred embodiment to be described with reference to FIGS. 11–19. Thus, dispenser 10 can dispense pliable concentrate directly from the freezer with no conditioning, whereas the dispenser 400 might require some minimal conditioning of the concentrate package before dispensing from it.

The beverage dispenser 400 includes a housing 402, a compartment 404 for receiving a one-piece, unitary, disposable, concentrate container-pump package 406, an air drive assembly 408 for pressurizing the concentrate container 410 portion of the package 406, a pump drive means 412 adjacent the portion of the compartment 404 that receives the pump 414 portion of the package 406, a water line 416 for connection to a disposable mixing nozzle 418 connected to the pump 414, and a refrigeration system 420.

The dispenser 400 is a plastic and stainless steel unit with curved corners and a lighted, curved front panel or door 422 with a removable lens 424 to change the graphics in front of a low heat fluorescent light 426. The door 422 opens vertically about a hinge 428 to provide access to a service panel 430 having a load/unload button 432 and to provide access to the compartment 404; preferably there are two such compartments 404 side-by-side as in FIG. 1; because they are identical, only one is shown.

The one-piece integral concentrate container-pump package 406 preferably will come two to a case and the separate mixing nozzle 418 is then snapped to the package. The package is shown in FIGS. 17–19.

The rear wall of the compartment 404 is a wall of the refrigeration system's ice bank tank 434 in which the water is kept at 34° F. to control the temperature of the concentrate and to cool the incoming water, via water cooling coils 436. The package 406 is slid into the compartment 404 and alignment lugs 438 on the pump 414 align the pump with the pump motor.

The package 406 has indicator means thereon, and the dispenser 400 has means for automatically reading the indicator means and then automatically setting the pump motor speed in response to the type of product (concentrate) in the package 406 (different products require different ratios of concentrate to water and thus different pumping speeds). This indicator means is preferably a plurality of lugs 442 on the filler cap 442. The automatic reading and setting means can be any such known means, for example, it can mechanically sense the lugs and then electrically set the pump speed to one of several predetermined speeds. The water flow rate is preferably fixed. The dispenser 400 also recognizes if no package is present, so as to inactivate the air drive. After inserting the package, the operator presses the load/unload button 432 which operates the air drive system 408 described below. This system locks the package 406 in place and punctures a label 444 over a hole 446 in the top wall of the package 406 above the package piston 448, with a tube 450 to pressurize the concentrate. The air drive system 408 also seals around the tube 450. The package remains pressurized until the load/unload button 432 is pushed, to vent the package and shut off the air. The air pressure is at about 50 psi in an accumulator tank but regulated to no more than 10–12 psi in the container 410. The regulator is not accessible to the store operator.

The water line 416 connected to the mixing nozzle 418 is regulated down to about 40 psi and includes a quick-disconnect with shut-off and a regulator washer.

The dispenser 400 can have either a push and hold dispense button 452 or an automatic fill system, such as an ultrasonic system.

The dispenser 400 provides accurate metering regardless of viscosity variations at or near freezer temperatures and with no or minimal conditioning (brief heating) of the package 406 after removal from the freezer, depending on the freezer temperature and the product.

Referring now in more detail to FIGS. 11–19 of the drawings, the dispenser 400 includes the housing 402 on legs 454, a cup support 456, a drip tray 458, and a pair of dispensing nozzles 460 (only one of which is shown in FIG. 11). The dispenser 400 is preferably a two-flavor dispenser (that is, it holds two separate disposable packages 406).

The compartments 404 each have a rear wall 462 which is semi-cylindrical and is a wall of the refrigeration tank 434. The pump drive means 412 is preferably a variable speed electric motor with a coupling 464 to receive a drive shaft 466 of the pump 414. The refrigeration system 420 includes the tank 434 for holding an ice water bath, a compressor 468, a fan 413, a condenser 414 and evaporator coils 474.

The air drive system 408 includes a compressed air source 476 including an air compressor, a motor, pressure regulators, a pressure vessel and air line 478. One embodiment of the air drive system is shown in FIGS. 12A–12C and another is shown in FIGS. 13A–13C.

FIGS. 12A–12C show one air drive assembly 510 used to pressurize the inside of the container 410 and drive the piston 448 to force concentrate into the pump 414. Of course, it will be understood that it can be used in a system not requiring a piston. The air drive assembly 510 receives compressed air from the compressed air source 476 via compressed air line 478. When a new package 406 is placed into the compartment 404, compressed air is delivered to the top of spring assembly 534 which is movably connected to spring 535. As the pressure is increased, spring 535 compresses which lowers spring assembly 534 until its inner edge resides in cavity 536 and its plate portion rests upon the top of container 410, as shown in FIG. 12B. That motion opens the small passageway into cavity 537 (see FIG. 12B). As a result of the air pressure, plate 538 then begins a downward movement compressing spring 539. As the air pressure increases above plate 538, its downward movement forces the air contained in cavity 544 through outlet 545, thereby reducing the resistive pressure to that downward movement. The air pressure increases such that plate 538 compresses spring 539 and moves downward with enough force such that hollow punch 541 punctures container 410, releasing the compressed air into container 410. During regular dispensing operation, the air pressure on top plate 538 is kept at the appropriate level to keep springs 535 and 539 completely compressed, thus creating cavity 542. In addition, the inside of container 410 above piston 448 is pressurized through its exposure to cavity 542 via the hollow opening of punch 541. The pressure maintained in cavity 542 and, subsequently, above the piston 448 is kept sufficiently high to provide constant pressure against the product by the piston causing the product (or concentrate) to be forced into the pump 414 on demand.

Referring to FIGS. 13A–13C, the operation of an alternative and currently preferred embodiment of an air drive assembly 511 will be discussed. As above, alternative embodiment of air drive assembly 511 receives compressed air from a compressed air source 476 via compressed air line 478. After a new package 406 is inserted, compressed air is delivered to the top of spring assembly 560 which is movably connected to spring 561. Initially, the pressure is increased causing spring 561 to compress, which lowers spring assembly 560 until an air tube or punch assembly 562 punctures container 410. Punch assembly 562 comprises hollow punch 564, spring 565, spring 566, and guard 567, all of which are attached to the plate portion of spring assembly 560. Guard 567 is a circular shroud about hollow punch 564 attached to the lower plate portion of spring assembly 560 by spring 565 used to prevent system operators from injuring themselves on the sharp point of hollow punch 564. Spring 566 allows spring assembly 560 to move relative to guard 567, thus allowing hollow punch 564 to penetrate container 410. Spring 566 is attached to flange 568 of hollow punch 564 and also to the lower plate portion of spring assembly 560. As the pressure above spring assembly 560 in cavity 569 is increased, the restoring force of spring 566 is initially strong enough to keep the head of hollow punch 564 resting on top of the plate portion of spring assembly 560 allowing hollow punch 564 to puncture canister 563. However, after container 410 has been punctured, the pressure in cavity 569 is increased such that spring 561 is fully compressed, and the restoring force of spring 566 is overcome to the extent that cavity 570 is created as shown in FIG. 13C. As spring assembly 560 is compressed away from hollow punch 564, orifice 571 in the shaft portion of hollow punch 564 is exposed. Orifice 571 delivers compressed air from cavity 569 to container 410 through the hollow shaft portion of punch 564, thereby pressurizing container 410. During operation, the pressure maintained in cavity 569 and, subsequently, above the piston 448 residing in container 410 is kept sufficiently high to provide constant pressure against the product causing that product to be forced into pump 414 on demand.

Although this embodiment uses a compressed air assembly, a collapsible bag type container could be used or the piston drive could be pressurized through another means such as a mechanical one.

After the container 410 is inserted into compartment 404 and pressurized, it delivers the product to the progressive cavity pump 521 via feed tube 522. Progressive cavity pump 521 is driven by motor 523, and its operation will be discussed herein with reference to FIGS. 14–16. In this embodiment, water from cooling coils 436 is delivered to water block 524 via conduit 525. The delivered water is mixed with the product delivered by the pump 521 from the container 410 into mixing chamber 532. In addition, before the final product is dispensed, it is further mixed by static mixer 526.

Referring to FIGS. 14 and 16, the operation of progressive cavity pump 521 in regard to a first embodiment of the present invention will be discussed. In operation, product is fed into the pump 521 via feed tube 522 where it is pumped to mixing chamber 532 through the progressive cavities formed as rotor 527 rotates within stator 528. Rotor 527 is further provided with vanes 529 (see FIG. 16) which extend beyond the pump cavity into mixing chamber 532. The purpose of vanes 529 is to break up the pumped product into several segments which reduces the back pressure on the stator and in the mixing chamber so that it will readily mix with the water. The water to be mixed with the product is delivered to water block 524 via water conduit 525 where it enters into passageway 530. Passageway 530 extends completely through rotor 527 and opens into mixing chamber 532 via opening 531. As the water enters mixing chamber 532 through opening 531, it is deflected rearwardly into mixing chamber 532 where it dislodges product from vanes 529 and mixes with that product as it is forced from pump 521. The water and product then passes through static mixer 526 for a final mix on its way to a cup.

Referring to FIG. 15, a second embodiment and currently preferred of the present invention will be described. In this embodiment, the pump housing is integral with the container 410 making it a single unit. It is intended that the entire unit (package 406 plus mixing nozzle 418) be disposable. Of course, the container 410 may be of any desired type known in the art and which is suitable for use with the progressive cavity pump; however, the embodiment disclosed herein is a piston type container. In addition, the water is injected directly into mixing chamber 532 via inlet 533 to produce the final mixed product. In operation, the container and pump package 406 is placed into the compartment 404 such that the pump 414 is rotatably connected to the motor 412 via rotor shaft connector or bendix drive 550. The pump and dispensing unit of this embodiment operate in a similar manner as previously described with reference to FIG. 14. The movement of the pump when turned on, including the movement of the stator, assists in heating the concentrate and making the concentrate more pliable since it is in contact with concentrate at the area where the concentrate feeds into the pump inlet. As is known in progressive cavity pumps, one of the two elements of the rotor and stator is a single lead screw and the other is a double lead screw, and the rotor drive shaft is off center. In the preferred embodiment, the rotor is made of high density polyethylene and the stator of rubberized polyolefin.

FIGS. 17 and 18 show the preferred one-piece, unitary package 406 of the present invention including the concentrate container 410 and the pump 414. The container 410 has a cylindrical side wall 606, a top wall 608, a bottom wall 610, a concentrate chamber 612, and a concentrate outlet opening 614. The container 410 preferably has a hole 446 in the top wall 608 thereof covered by a label 444 which is pierced by the punch or air tube 450. The container 410 also has a piston 448 which is forced down by the air pressure and pushes the concentrate 515 into the pump 414. The hole 446 is not essential because the air tube could alternatively pierce the top wall. The pump 414 includes a housing 615 having an intermediate wall 616 to define the stator chamber 617. The stator 528' abuts the wall 616. The wall 616 has an opening 618 which is a bearing for the ring 619 of the rotor 527'. The ring 619 has openings or serrations 613 in its periphery which are the concentrate inlet openings to the pump. The rotor shaft includes a labyrinth seal 611 where it rotatably extends through the housing 615.

The container 410 is preferably injection molded of polyethylene with a wall thickness of about 0.060 inch. The container 410 is preferably hot plate welded to the pump 414, which is also injection molded of polyethylene. While other types of pumps could be used in this package, the pump is preferably a positive displacement pump and preferably a rotary positive displacement pump (in contrast to a reciprocating pump) and most preferably a progressive cavity pump.

The package 406 is preferably oriented upside-down during shipping. The container 410 is filled through a fill opening 600 adjacent the pump. A fill opening cap 602 seals the opening 600 after filling. The stator 528' can move or flex sideways during pumping by virtue of the flexible seal 604; this avoids the need for an expensive constant velocity joint to the pump.

The mixing nozzle 418 is attached to the pump 414 either before or after inserting the package 406 into the dispenser 400. After insertion and attachment of the mixing nozzle, the water line 416 is connected to the mixing nozzle.

Although the preferred pump is a progressive cavity pump, other pumps can be used, such as the swash plate pump 620 shown in FIGS. 19 and 20. The swash plate pump 620 includes a main housing 622 and at one end thereof a seal 624 and manifold 626. At the other end of the main housing 622 is a capture housing 628 holding for rotation a cylinder 630, pistons 632, and a swash plate 634. A drive shaft extends out of the housing 622 for connection to a motor.

An important feature of this invention is that the package and air drive stuff the pump. That is, the concentrate is in flow communication with the pump inlet and is under pressure. This cannot be done with some pumps, such as flexible vane pumps, because the concentrate would be forced right through the pump.

The preferred embodiment of this invention allows dispensing of a concentrate at or near freezer temperatures with no or minimal conditioning (warming). This invention allows dispensing at or above the ice point (and in some cases below the ice point) and provides a product with an ice point at or close to freezer temperatures. The ice point is the temperature at which crystals of ice begin to form. The prior art teaches that the concentrate must be at least 35°–45° F. This invention can dispense at 5° F. for all products (except grapefruit, which must be at about 10° F.). The ice point differs for different products. Also, freezer temperature differs for different freezers, varying from about –25° F. to 10° F. The ice point for 5+1 orange juice (58.5 Brix) is about 0° F. and for 3+1 orange juice (41.8 Brix) is about 17.5° F. This invention includes providing a product which has an ice point at or near freezer temperatures. If the ice point for a product is 0° F., and the freezer temperature is –5° F., then a little, quick, warming would be used (for example, by immersing in hot water for a short time or placing in a microwave). This is what is meant by "little or no conditioning" in contrast to the prior art practice of placing in a refrigerator for two to three days, to thaw to 35° F. to 40° F.

The concentrate should be high enough in ratio (e.g., 5+1) such that ice does not form at or near freezer temperatures.

The prior art dispensers require the viscosity of the concentrate to be below about 8000 centipoise. The present invention works even though the viscosity is much higher, such as 500,000 centipoise and often up to 13,000,000 centipoise.

While the preferred embodiment of this invention has been described above in detail, it is to be understood that variations and modifications can be made therein without departing from the spirit and scope of the present invention. For example, any desired system for applying pressure to the concentrate to force it into the metering pump can be used. It is not essential that it be mechanical or pneumatic and if it is, it is not essential that the specific system described above be used. Also, other arrangements for actuating the metering pump can be used and they do not need to be mechanical and even if mechanical they do not need to be the specific arrangement shown above. Other arrangements of metering and other mixing systems can be used. The metering pump and mixing nozzle do not have to be part of the same single integral unit. While the preferred embodiment of this invention is for use with juices, such as orange juice, it is not limited thereto. Other concentrate containers can be used in place of the specific construction described above. The container need not have the specific cylindrical shape shown nor need the piston have the shape shown. Other suitable shapes can be used. The pump could be on the top or side wall of the container, for example. An electrical resistance heating element could be used in the compartment, if desired. While a positive displacement pump is preferred, others could be used in conjunction with a separate metering device downstream therefrom. Although it is preferred to use a one-piece, integral package, including the concentrate container and pump (i.e., with the pump embedded or incorporated into the container as a part thereof), the container and pump can be separate if desired and then connected together, as the mixing nozzle is connected to the package.

What is claimed is:

1. An article comprising:

(a) a integral, disposable, molded plastic package, said package including:
  (i) a concentrate container enclosing a concentrate chamber and a chamber outlet opening in said container;
  (ii) a progressive cavity pump integrally connected to said container and including a pump inlet open to said chamber outlet;
  (iii) a fill opening for filling said chamber with concentrate and a fill opening cap sealingly closing said fill opening;
  (iv) said pump including a rotor, a stator and a pump housing, said pump housing being connected to said container, said stator being flexibly mounted in said pump housing such that said stator can move in a direction transverse to the longitudinal axis of said stator, said rotor having a drive shaft extending exteriorily of said pump housing for connection to a drive means, and said pump housing having an internal wall abutting a proximal end of said stator for preventing said stator from moving in the longitudinal direction toward said rotor drive shaft; and
  (v) a mixing nozzle connected to said pump housing for receiving concentrate from a distal end of said rotor and a water inlet in said mixing nozzle.

* * * * *

UNITED STATES PATENT AND TRADEMARK OFFICE
CERTIFICATE OF CORRECTION

PATENT NO. : 5,494,193

DATED : February 27, 1996

INVENTOR(S) : Kirschner et al.

It is certified that error appears in the above-identified patent and that said Letters Patent is hereby corrected as shown below:

In the Title Page, at " [75] Inventors:", after "Inventors:", delete [Jonathan Kirschner, Powder Springs; Simon J. Richter, Marietta; Mark S. Heflin, Atlanta; Shawn B. Gatipon, Smyrna, all of Ga; Jack F. Brumley, Houston, Tex; Michael T. Romanyszyn, Jr., San Antonio, Tex.; Alfred A. Schroeder, San Antonio; Samuel Durham, San Antonio, Tex.; Harold R. Heath, Houston, Tex.; Richard O. Norman, San Antonio, Tex.; Norman P. Wittig, Corry, Pa.], and insert therefor
--Michael T. Romanyszyn, Jr., Alfred A. Schroeder, both of San Antonio, Tex.--.

Signed and Sealed this

Third Day of December, 1996

Attest:

BRUCE LEHMAN

*Attesting Officer*     *Commissioner of Patents and Trademarks*